(12) United States Patent
Tofte et al.

(10) Patent No.: US 12,062,097 B1
(45) Date of Patent: Aug. 13, 2024

(54) DISASTER DAMAGE ANALYSIS AND LOSS MITIGATION IMPLEMENTING UNMANNED AERIAL VEHICLES (UAVs)

(71) Applicant: STATE FARM MUTUAL AUTOMOBILE INSURANCE COMPANY, Bloomington, IL (US)

(72) Inventors: Nathan L. Tofte, Downs, IL (US); Timothy W. Ryan, Hudson, IL (US); Nathan W. Baumann, Bloomington, IL (US); Michael Shawn Jacob, Le Roy, IL (US); Joshua David Lillie, Bloomington, IL (US); Brian N. Harvey, Bloomington, IL (US); Roxane Lyons, Chenoa, IL (US); Rosemarie Geier Grant, Ellsworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 233 days.

(21) Appl. No.: 16/838,485

(22) Filed: Apr. 2, 2020

Related U.S. Application Data

(63) Continuation of application No. 14/858,034, filed on Sep. 18, 2015, now abandoned.
(Continued)

(51) Int. Cl.
*G06V 20/40* (2022.01)
*B64C 39/02* (2023.01)
(Continued)

(52) U.S. Cl.
CPC ........... *G06Q 40/08* (2013.01); *B64C 39/024* (2013.01); *B64D 47/08* (2013.01); *G01C 11/02* (2013.01);
(Continued)

(58) Field of Classification Search
None
See application file for complete search history.

(56) References Cited

U.S. PATENT DOCUMENTS 3,170,206 A 2/1965 Triplett
3,767,152 A 10/1973 Killinger
(Continued)

FOREIGN PATENT DOCUMENTS

EP 3239686 A1 11/2017
EP 3578433 B1 8/2020
(Continued)

OTHER PUBLICATIONS

B. Uragun, "Energy Efficiency for Unmanned Aerial Vehicles," 2011 10th International Conference on Machine Learning and Applications and Workshops, 2011, pp. 316-320 (Year: 2011).*
(Continued)

*Primary Examiner* — Mohammad Z Shaikh
(74) *Attorney, Agent, or Firm* — MARSHALL, GERSTEIN & BORUN LLP

(57) ABSTRACT

Various techniques are described utilizing one or more unmanned aerial vehicles (UAVs, or "drones") for various disaster and/or catastrophe-related purposes. UAVs may collect data in an attempt to predict the occurrence and/or extent of a catastrophe and/or to mitigate the impact of a catastrophe before and, if not at that time, once it has occurred. The UAVs may perform various tasks such that the damage to property caused by a catastrophe (or potential catastrophe) may be eliminated or mitigated. A UAV may receive a flight path based on an energy consumption related condition and operate based on the flight path. Operating based on the flight path includes docking the UAV with a power supply device for charging a power source of the UAV.

9 Claims, 5 Drawing Sheets

Related U.S. Application Data

(60) Provisional application No. 62/209,963, filed on Aug. 26, 2015, provisional application No. 62/209,755, filed on Aug. 25, 2015, provisional application No. 62/209,627, filed on Aug. 25, 2015, provisional application No. 62/208,201, filed on Aug. 21, 2015, provisional application No. 62/207,421, filed on Aug. 20, 2015, provisional application No. 62/207,127, filed on Aug. 19, 2015, provisional application No. 62/053,519, filed on Sep. 22, 2014.

(51) Int. Cl.
| | | |
|---|---|---|
| *B64D 47/08* | (2006.01) | |
| *G01C 11/02* | (2006.01) | |
| *G06F 18/22* | (2023.01) | |
| *G06Q 40/08* | (2012.01) | |
| *G06T 7/00* | (2017.01) | |
| *G06T 7/20* | (2017.01) | |
| *G06T 7/246* | (2017.01) | |
| *G06T 7/73* | (2017.01) | |
| *G06T 11/60* | (2006.01) | |
| *G06T 17/05* | (2011.01) | |
| *G06V 10/42* | (2022.01) | |
| *G06V 20/10* | (2022.01) | |
| *H04N 5/44* | (2011.01) | |
| *H04N 7/18* | (2006.01) | |
| *B64U 10/00* | (2023.01) | |
| *B64U 101/00* | (2023.01) | |
| *B64U 101/30* | (2023.01) | |

(52) U.S. Cl.
CPC ............... *G06F 18/22* (2023.01); *G06T 7/00* (2013.01); *G06T 7/20* (2013.01); *G06T 7/246* (2017.01); *G06T 7/75* (2017.01); *G06T 11/60* (2013.01); *G06T 17/05* (2013.01); *G06V 10/42* (2022.01); *G06V 20/10* (2022.01); *G06V 20/41* (2022.01); *H04N 5/44* (2013.01); *H04N 7/185* (2013.01); *B64U 10/00* (2023.01); *B64U 2101/00* (2023.01); *B64U 2101/30* (2023.01); *G06T 2207/10032* (2013.01); *G06T 2207/30232* (2013.01); *G06T 2207/30236* (2013.01); *G06T 2207/30252* (2013.01); *G06T 2215/16* (2013.01); *G06V 20/44* (2022.01)

(56) References Cited

U.S. PATENT DOCUMENTS

| | | | |
|---|---|---|---|
| 3,883,926 A | 5/1975 | Reynolds | |
| 5,035,558 A | 7/1991 | Prosen | |
| 5,076,079 A | 12/1991 | Monoson et al. | |
| 5,207,171 A | 5/1993 | Westwood, III | |
| 5,686,892 A | 11/1997 | Smith | |
| 5,730,246 A | 3/1998 | Beard | |
| 5,875,867 A | 3/1999 | Beard | |
| 5,913,479 A | 6/1999 | Westwood, III | |
| 5,975,499 A | 11/1999 | Ostrobrod | |
| 6,056,237 A | 5/2000 | Woodland | |
| 6,112,853 A | 9/2000 | Beard | |
| 6,166,729 A | 12/2000 | Acosta et al. | |
| 6,567,044 B2 | 5/2003 | Carroll | |
| 7,053,823 B2 | 5/2006 | Cervinka et al. | |
| 7,458,238 B2 | 12/2008 | Stolk et al. | |
| 7,480,715 B1 | 1/2009 | Barker et al. | |
| 7,493,211 B2 | 2/2009 | Breen | |
| 7,523,910 B2 | 4/2009 | Moran | |
| 7,755,496 B1 * | 7/2010 | Bernstein .............. G08B 5/002 | |
| | | | 340/573.3 |
| 7,809,587 B2 | 10/2010 | Dorai et al. | |
| 7,889,931 B2 | 2/2011 | Webb et al. | |
| 7,912,738 B1 | 3/2011 | Martin | |
| 7,953,615 B2 | 5/2011 | Aquila et al. | |
| 8,019,629 B1 | 9/2011 | Medina, III et al. | |
| 8,025,125 B2 | 9/2011 | Vetesnik et al. | |
| 8,095,391 B2 | 1/2012 | Obora et al. | |
| 8,239,220 B2 | 8/2012 | Kidd et al. | |
| 8,265,963 B1 | 9/2012 | Hanson et al. | |
| 8,280,633 B1 | 10/2012 | Eldering et al. | |
| 8,346,578 B1 | 1/2013 | Hopkins, III et al. | |
| 8,355,966 B1 | 1/2013 | Vu et al. | |
| 8,374,957 B1 | 2/2013 | Garcia et al. | |
| 8,401,878 B2 | 3/2013 | Stender et al. | |
| 8,511,606 B1 * | 8/2013 | Lutke ................... B64C 39/024 | |
| | | | 320/109 |
| 8,527,305 B1 | 9/2013 | Hanson et al. | |
| 8,537,338 B1 | 9/2013 | Medasani et al. | |
| 8,543,486 B2 | 9/2013 | Donoho et al. | |
| 8,630,820 B2 | 1/2014 | Amis | |
| 8,650,106 B1 | 2/2014 | Hopkins, III | |
| 8,700,434 B1 | 4/2014 | DeLong et al. | |
| 8,712,893 B1 | 4/2014 | Brandmaier et al. | |
| 8,756,085 B1 | 6/2014 | Plummer et al. | |
| 8,788,127 B1 | 7/2014 | Waldo et al. | |
| 8,799,034 B1 | 8/2014 | Brandmaier et al. | |
| 8,818,572 B1 | 8/2014 | Tofte et al. | |
| 8,862,288 B2 * | 10/2014 | Vavrina ................. B60L 53/51 | |
| | | | 701/3 |
| 8,872,818 B2 | 10/2014 | Freeman et al. | |
| 8,899,303 B2 * | 12/2014 | Mueller ................. B22C 7/02 | |
| | | | 164/369 |
| 8,909,391 B1 | 12/2014 | Peeters et al. | |
| 8,930,044 B1 | 1/2015 | Peeters et al. | |
| 8,948,935 B1 * | 2/2015 | Peeters ................. G05D 1/102 | |
| | | | 709/201 |
| 8,970,400 B2 | 3/2015 | Verna et al. | |
| 8,983,682 B1 | 3/2015 | Peeters et al. | |
| 9,019,092 B1 | 4/2015 | Brandmaier et al. | |
| 9,020,536 B1 | 4/2015 | Crossno et al. | |
| 9,051,043 B1 * | 6/2015 | Peeters ................. G06Q 10/083 | |
| 9,069,869 B1 | 6/2015 | Quinn et al. | |
| 9,082,015 B2 | 7/2015 | Christopulos et al. | |
| 9,129,355 B1 | 9/2015 | Harvey et al. | |
| 9,131,224 B1 | 9/2015 | Freeman et al. | |
| 9,139,310 B1 * | 9/2015 | Wang ..................... B64C 39/02 | |
| 9,159,132 B1 | 10/2015 | Crowsey | |
| 9,162,753 B1 * | 10/2015 | Panto ................... G08G 5/0069 | |
| 9,170,117 B1 * | 10/2015 | Abuelsaad ............ B64C 39/024 | |
| 9,254,363 B2 | 2/2016 | Levien et al. | |
| 9,307,383 B1 * | 4/2016 | Patrick ................... B64U 10/14 | |
| 9,311,271 B2 | 4/2016 | Wright | |
| 9,443,207 B2 | 9/2016 | Przybylko et al. | |
| 9,505,494 B1 | 11/2016 | Marlow et al. | |
| 9,536,148 B2 | 1/2017 | Gross | |
| 9,563,201 B1 | 2/2017 | Tofte et al. | |
| 9,609,288 B1 | 3/2017 | Richman et al. | |
| 9,612,598 B2 | 4/2017 | Schultz et al. | |
| 9,633,487 B2 | 4/2017 | Wright | |
| 9,646,283 B2 | 5/2017 | Kantor et al. | |
| 9,665,094 B1 | 5/2017 | Russell | |
| 9,678,507 B1 * | 6/2017 | Douglas ................ G08G 5/0013 | |
| 9,691,103 B1 | 6/2017 | Hopkins, III | |
| 9,754,325 B1 | 9/2017 | Konrardy et al. | |
| 9,776,716 B2 * | 10/2017 | Levien .................. B64C 39/024 | |
| 9,792,656 B1 | 10/2017 | Konrardy et al. | |
| 9,824,397 B1 | 11/2017 | Patel et al. | |
| 9,830,748 B2 | 11/2017 | Rosenbaum | |
| 9,846,915 B2 | 12/2017 | Howe et al. | |
| 9,852,487 B1 | 12/2017 | Farnsworth et al. | |
| 9,870,609 B2 | 1/2018 | Kompalli et al. | |
| 9,875,509 B1 | 1/2018 | Harvey et al. | |
| 9,894,327 B1 | 2/2018 | Jacob | |
| 9,928,553 B1 | 3/2018 | Harvey et al. | |
| 9,953,287 B1 * | 4/2018 | McDonald, Jr. ......... B64D 1/02 | |
| 9,972,054 B1 | 5/2018 | Konrardy et al. | |
| 9,978,030 B2 | 5/2018 | Lim | |
| 9,990,782 B2 | 6/2018 | Rosenbaum | |
| 10,102,584 B1 | 10/2018 | Devereaux et al. | |
| 10,102,589 B1 | 10/2018 | Tofte et al. | |
| 10,145,684 B1 | 12/2018 | Tofte et al. | |

(56) References Cited

U.S. PATENT DOCUMENTS

| | | |
|---|---|---|
| 10,163,162 B1 | 12/2018 | Devereaux et al. |
| 10,163,164 B1 | 12/2018 | Tofte et al. |
| 10,192,369 B2 | 1/2019 | Wright |
| 10,198,879 B2 | 2/2019 | Wright |
| 10,269,190 B2 | 4/2019 | Rosenbaum |
| 10,311,302 B2 | 6/2019 | Kottenstette et al. |
| 10,366,288 B1 | 7/2019 | Kottenstette et al. |
| 10,373,256 B1 | 8/2019 | Allen et al. |
| 10,410,289 B1 | 9/2019 | Tofte et al. |
| 10,467,824 B2 | 11/2019 | Rosenbaum |
| 10,535,103 B1 | 1/2020 | Tofte et al. |
| 10,643,072 B2 | 5/2020 | Kottenstette et al. |
| 10,839,336 B2* | 11/2020 | Greiner .............. G05D 1/0676 |
| 10,909,628 B1 | 2/2021 | Tofte et al. |
| 11,151,378 B2 | 10/2021 | Kottenstette et al. |
| 11,210,552 B2 | 12/2021 | Kossyk et al. |
| 11,222,426 B2 | 1/2022 | Richter et al. |
| 11,227,452 B2 | 1/2022 | Rosenbaum |
| 11,232,150 B2 | 1/2022 | Vianello et al. |
| 11,367,265 B2 | 6/2022 | Vianello et al. |
| 11,407,410 B2 | 8/2022 | Rosenbaum |
| 11,524,707 B2 | 12/2022 | Rosenbaum |
| 11,594,083 B1 | 2/2023 | Rosenbaum |
| 2002/0002475 A1 | 1/2002 | Freedman et al. |
| 2002/0007225 A1 | 1/2002 | Costello et al. |
| 2002/0055861 A1 | 5/2002 | King et al. |
| 2003/0004636 A1 | 1/2003 | Adachi |
| 2003/0040934 A1 | 2/2003 | Skidmore et al. |
| 2003/0069002 A1 | 4/2003 | Hunter et al. |
| 2003/0154111 A1 | 8/2003 | Dutra et al. |
| 2004/0088198 A1 | 5/2004 | Childress et al. |
| 2004/0243423 A1 | 12/2004 | Rix et al. |
| 2005/0080649 A1 | 4/2005 | Alvarez et al. |
| 2005/0128074 A1 | 6/2005 | Culpepper et al. |
| 2006/0058928 A1* | 3/2006 | Beard .................. G05D 1/101 701/11 |
| 2006/0071783 A1 | 4/2006 | Culpepper et al. |
| 2006/0167597 A1 | 7/2006 | Bodin et al. |
| 2006/0249622 A1* | 11/2006 | Steele ................ B64F 1/02 244/115 |
| 2006/0289233 A1 | 12/2006 | Flaherty |
| 2008/0091490 A1 | 4/2008 | Abrahams et al. |
| 2008/0114655 A1 | 5/2008 | Skidmore |
| 2008/0159591 A1 | 7/2008 | Ruedin |
| 2008/0224854 A1 | 9/2008 | Furey et al. |
| 2008/0255887 A1 | 10/2008 | Gruter |
| 2009/0002364 A1 | 1/2009 | Witte, II |
| 2009/0027253 A1 | 1/2009 | van Tooren et al. |
| 2009/0055226 A1 | 2/2009 | Tritz et al. |
| 2009/0138290 A1 | 5/2009 | Holden |
| 2009/0157437 A1 | 6/2009 | Becerra et al. |
| 2009/0216421 A1* | 8/2009 | Sawut .............. F02D 41/1406 701/102 |
| 2009/0219393 A1 | 9/2009 | Vian et al. |
| 2009/0265193 A1 | 10/2009 | Collins et al. |
| 2010/0012769 A1 | 1/2010 | Alber et al. |
| 2010/0027460 A1 | 2/2010 | Kim et al. |
| 2010/0156816 A1 | 6/2010 | Relyea, Jr. et al. |
| 2010/0215212 A1 | 8/2010 | Flakes, Jr. |
| 2010/0235198 A1 | 9/2010 | Fini et al. |
| 2010/0250022 A1 | 9/2010 | Hines et al. |
| 2010/0302359 A1 | 12/2010 | Adams et al. |
| 2011/0006174 A1 | 1/2011 | Hollinger |
| 2011/0046920 A1 | 2/2011 | Amis |
| 2011/0130636 A1* | 6/2011 | Daniel .................. H04Q 9/00 709/201 |
| 2011/0137443 A1 | 6/2011 | Farahani |
| 2011/0161118 A1 | 6/2011 | Borden et al. |
| 2011/0218825 A1 | 9/2011 | Hertenstein |
| 2011/0264311 A1* | 10/2011 | Lee .................. H04N 7/183 348/E7.085 |
| 2012/0016538 A1* | 1/2012 | Waite .................. G05D 1/10 701/3 |
| 2012/0033821 A1 | 2/2012 | Ohta et al. |
| 2012/0071998 A1 | 3/2012 | Davies et al. |
| 2012/0140041 A1 | 6/2012 | Burgunder et al. |
| 2012/0170797 A1 | 7/2012 | Pershing et al. |
| 2012/0173290 A1 | 7/2012 | Collins et al. |
| 2012/0209782 A1 | 8/2012 | Pershing et al. |
| 2012/0210853 A1 | 8/2012 | Abershitz et al. |
| 2012/0250010 A1 | 10/2012 | Hannay |
| 2012/0265698 A1 | 10/2012 | Kidd et al. |
| 2012/0271461 A1* | 10/2012 | Spata .................. G01W 1/08 706/45 |
| 2012/0299751 A1 | 11/2012 | Verna et al. |
| 2012/0303336 A1 | 11/2012 | Becker et al. |
| 2013/0033381 A1 | 2/2013 | Breed |
| 2013/0033851 A1 | 2/2013 | Wang |
| 2013/0060710 A1 | 3/2013 | Preuss et al. |
| 2013/0216089 A1 | 8/2013 | Chen et al. |
| 2013/0226624 A1 | 8/2013 | Blessman et al. |
| 2013/0233964 A1* | 9/2013 | Woodworth ........... G05D 1/104 244/2 |
| 2013/0240673 A1* | 9/2013 | Schlosser ............. B64D 1/12 701/3 |
| 2013/0317865 A1 | 11/2013 | Tofte et al. |
| 2014/0006841 A1 | 1/2014 | Rohleder et al. |
| 2014/0019166 A1 | 1/2014 | Swanson et al. |
| 2014/0032034 A1* | 1/2014 | Raptopoulos ........ G05D 1/0088 701/25 |
| 2014/0058763 A1 | 2/2014 | Zizzamia et al. |
| 2014/0100889 A1 | 4/2014 | Tofte |
| 2014/0111332 A1 | 4/2014 | Przybylko et al. |
| 2014/0124621 A1* | 5/2014 | Godzdanker ........ B64F 1/125 244/110 E |
| 2014/0129059 A1* | 5/2014 | Scarlatti .................. G05D 1/00 701/16 |
| 2014/0132409 A1 | 5/2014 | Billman et al. |
| 2014/0163852 A1 | 6/2014 | Borri et al. |
| 2014/0168420 A1 | 6/2014 | Naderhirn et al. |
| 2014/0244078 A1 | 8/2014 | Downey et al. |
| 2014/0245210 A1 | 8/2014 | Battcher et al. |
| 2014/0257862 A1 | 9/2014 | Billman et al. |
| 2014/0277854 A1* | 9/2014 | Jones .................. B64C 39/024 701/1 |
| 2014/0288976 A1 | 9/2014 | Thomas et al. |
| 2014/0316614 A1 | 10/2014 | Newman |
| 2014/0320651 A1 | 10/2014 | Mcclatchie et al. |
| 2014/0324405 A1 | 10/2014 | Plummer et al. |
| 2014/0334684 A1 | 11/2014 | Strimling |
| 2014/0336928 A1 | 11/2014 | Scott |
| 2014/0353422 A1 | 12/2014 | Westbrook, Sr. |
| 2014/0360832 A1* | 12/2014 | Aldrich .................. B60L 9/08 191/12.2 R |
| 2014/0368378 A1 | 12/2014 | Crain et al. |
| 2015/0016127 A1 | 1/2015 | Brutsche et al. |
| 2015/0019267 A1 | 1/2015 | Prieto et al. |
| 2015/0020558 A1 | 1/2015 | Williams |
| 2015/0025914 A1 | 1/2015 | Lekas |
| 2015/0046194 A1 | 2/2015 | Waddell et al. |
| 2015/0105933 A1 | 4/2015 | Martin et al. |
| 2015/0120094 A1* | 4/2015 | Kimchi .............. G06Q 10/083 701/3 |
| 2015/0140954 A1 | 5/2015 | Maier et al. |
| 2015/0148988 A1* | 5/2015 | Fleck .................. B64D 1/14 701/2 |
| 2015/0158587 A1* | 6/2015 | Patrick .................. B64D 1/12 701/3 |
| 2015/0158599 A1* | 6/2015 | Sisko .................. B64F 1/20 244/114 R |
| 2015/0183226 A1* | 7/2015 | Kudo .................. B41J 2/17596 347/85 |
| 2015/0225081 A1* | 8/2015 | Stabler .................. G05D 1/0088 701/3 |
| 2015/0245210 A1 | 8/2015 | Kwon et al. |
| 2015/0254738 A1 | 9/2015 | Wright, III et al. |
| 2015/0266575 A1* | 9/2015 | Borko .................. B64F 1/222 244/17.23 |
| 2015/0323932 A1 | 11/2015 | Paduano et al. |
| 2015/0336668 A1* | 11/2015 | Pasko .................. B64C 39/024 701/2 |

(56) References Cited

U.S. PATENT DOCUMENTS

| | | | |
|---|---|---|---|
| 2015/0336669 A1* | 11/2015 | Kantor | G01C 21/343 701/3 |
| 2015/0336671 A1* | 11/2015 | Winn | B64C 39/024 701/3 |
| 2015/0339933 A1* | 11/2015 | Batla | G08G 5/0082 701/120 |
| 2015/0348204 A1 | 12/2015 | Daues | |
| 2015/0363717 A1 | 12/2015 | Lim | |
| 2015/0370251 A1* | 12/2015 | Siegel | G05D 1/0684 701/2 |
| 2015/0379874 A1* | 12/2015 | Ubhi | G08G 5/0043 701/3 |
| 2016/0063642 A1 | 3/2016 | Luciani et al. | |
| 2016/0068265 A1* | 3/2016 | Hoareau | G06Q 10/083 701/3 |
| 2016/0071217 A1 | 3/2016 | Edwards et al. | |
| 2016/0071379 A1 | 3/2016 | McKiel, Jr. | |
| 2016/0088286 A1 | 3/2016 | Forsythe et al. | |
| 2016/0111006 A1* | 4/2016 | Srivastava | G05D 1/0094 701/3 |
| 2016/0159462 A1* | 6/2016 | Hayes | G06F 3/0481 701/3 |
| 2016/0163204 A1* | 6/2016 | Raptopoulos | G08G 5/0069 701/3 |
| 2016/0189303 A1 | 6/2016 | Fuchs | |
| 2016/0196756 A1* | 7/2016 | Prakash | G06Q 10/083 701/3 |
| 2016/0203694 A1 | 7/2016 | Hogasten et al. | |
| 2016/0216711 A1* | 7/2016 | Srivastava | G06Q 10/0631 |
| 2016/0217694 A1* | 7/2016 | Batla | G08G 5/0039 |
| 2016/0247404 A1* | 8/2016 | Srivastava | B64C 39/024 |
| 2016/0257423 A1* | 9/2016 | Martin | B64F 1/00 |
| 2016/0300493 A1* | 10/2016 | Ubhi | G08G 5/0082 |
| 2017/0083979 A1 | 3/2017 | Winn et al. | |
| 2017/0200259 A1 | 7/2017 | Yang et al. | |
| 2017/0210451 A1 | 7/2017 | Oh | |
| 2017/0352100 A1 | 12/2017 | Shreve et al. | |
| 2018/0279105 A1 | 9/2018 | Huber et al. | |
| 2021/0192629 A1 | 6/2021 | Tofte et al. | |
| 2021/0256614 A1 | 8/2021 | Tofte et al. | |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |
| WO | WO-2015/158265 A1 | 10/2015 |

OTHER PUBLICATIONS

Kim, Jonghoe et al., On theScheduling of Systems of UAVs and FuelService Stations for Long-TermMission Fulfillment', Journal of Intelligent and Robotic Systems, vol. 70, Issue 1-4, Apr. 2013, pp. 347-359. (Year: 2013).*

Song, Byung Duk et al.,"Persistent UAVService: An Improved Scheduling Formulation and Prototypes of System Components", Journal of Intelligent and RoboticSystems, vol. 74, Issue 1, Apr. 2014, pp. 221-232 (Year: 2014).*

Mulgonkar, Yash, "Automated Recharging for Persistence Missions With Multiple Micro Aero Vehicles", Master's Thesis, University of Pennsylvania, 2012, 44 pages (Year: 2012).*

Samadzadegan et al., Earthquake destruction assessment of urban roads network using satellite imagery and fuzzy inference systems, The International Archives of Photogrammetry, Remote Sensing and Spatial Information Sciences, vol. xxxvii, p. B8, pp. 1-6, Beijing, China (2008).

U.S. Appl. No. 14/858,034, Final Office Action, dated Apr. 28, 2020.
U.S. Appl. No. 14/858,034, Final Office Action, dated Feb. 24, 2021.
U.S. Appl. No. 14/858,034, Nonfinal Office Action, dated Jan. 10, 2020.
U.S. Appl. No. 14/858,034, Nonfinal Office Action, dated Sep. 17, 2020.
U.S. Appl. No. 14/858,052, Nonfinal Office Action, dated Jun. 25, 2019.
U.S. Appl. No. 14/858,058, Final Office Action, dated Apr. 24, 2020.
U.S. Appl. No. 14/858,058, Final Office Action, dated Mar. 10, 2021.
U.S. Appl. No. 14/858,058, Final Office Action, dated May 30, 2019.
U.S. Appl. No. 14/858,058, Nonfinal Office Action, dated Nov. 1, 2019.
U.S. Appl. No. 14/858,058, Nonfinal Office Action, Sep. 17, 2020.
U.S. Appl. No. 16/838,372, Final Office Action, dated Nov. 22, 2021.
U.S. Appl. No. 16/838,372, Nonfinal Office Action, dated May 27, 2021.
U.S. Appl. No. 16/838,417, Nonfinal Office Action, dated Oct. 6, 2021.
Yamazaki et al., Applications of remote sensing and GIS for damage assessment, Earthquake Disaster Mitigation Research Center, NIED, Hyogo, Japan Institute of Industrial Science, University of Tokyo, Tokyo, Japan, pp. 1-12 (2001).
U.S. Appl. No. 16/838,417, Notice of Allowance, dated Mar. 8, 2022.
U.S. Appl. No. 13/647,098, filed Oct. 8, 2012.
U.S. Appl. No. 13/836,695, filed Mar. 15, 2013.
U.S. Appl. No. 13/839,634, filed Mar. 15, 2013.
U.S. Appl. No. 13/893,904, filed May 14, 2013.
Frey, Thomas, "192 Future Uses for Flying Drones," Business Trends. (Sep. 2, 2014).
"How do Body Shop Estimates Affect Car Insurance Claims?" CarInsuranceQuotes.com (Aug. 19, 2013).
Costonis, Michael, "Better Insurer Service Can Reduce Consumer Tolerance Schemes," Journal of Insurance Fraud in America (Fall 2011).
Sorcher, Sara, "What Drones Can Do For You," National Journal, Washington, Apr. 11, 2013, pp. 1-4.
U.S. Appl. No. 14/510,307, filed Oct. 9, 2014.
U.S. Appl. No. 14/510,492, filed Oct. 9, 2014.
U.S. Appl. No. 14/510,536, filed Oct. 9, 2014.
U.S. Appl. No. 14/808,502, filed Jul. 24, 2015.
U.S. Appl. No. 14/858,038, filed Sep. 18, 2015.
U.S. Appl. No. 14/858,052, filed Sep. 18, 2015.
U.S. Appl. No. 14/858,058, filed Sep. 18, 2015.
U.S. Appl. No. 14/858,034, filed Sep. 18, 2015.
U.S. Appl. No. 14/510,502, filed Oct. 9, 2014.
U.S. Appl. No. 14/858,699, filed Sep. 18, 2015.
U.S. Appl. No. 14/858,073, filed Sep. 18, 2015.
U.S. Appl. No. 14/858,076, filed Sep. 18, 2015.
U.S. Appl. No. 14/824,859, filed Aug. 12, 2015.
U.S. Appl. No. 14/858,075, filed Sep. 18, 2015.
Office Action issued in U.S. Appl. No. 14/858,034 dated Apr. 3, 2018.
Office Action issued in U.S. Appl. No. 14/858,038 dated Mar. 29, 2018.
Office Action issued in U.S. Appl. No. 14/858,073 dated Apr. 20, 2018.
Office Action issued in U.S. Appl. No. 14/858,076 dated Dec. 28, 2017.
Office Action issued in U.S. Appl. No. 14/858,076 dated Apr. 20, 2018.
Office Action issued in U.S. Appl. No. 14/858,052 dated Jun. 15, 2018.
Office Action issued in U.S. Appl. No. 16/045,851 dated Sep. 4, 2018.
Office Action issued in U.S. Appl. No. 14/858,034 dated Jul. 26, 2018.
Office Action issued in U.S. Appl. No. 14/858,034 dated Dec. 14, 2018.

(56) References Cited

OTHER PUBLICATIONS

Office Action issued in U.S. Appl. No. 14/858,075 dated Jan. 25, 2019.
Office Action issued in U.S. Appl. No. 14/858,052 dated Nov. 14, 2018.
Office Action issued in U.S. Appl. No. 14/858,699 dated Dec. 31, 2018.
Office Action issued in U.S. Appl. No. 14/858,058 dated Jan. 11, 2019.
Office Action issued in U.S. Appl. No. 14/585,058 dated May 30, 2019.
Office Action issued in U.S. Appl. No. 14/858,034, mailed May 30, 2019.
Costonis, Michael A. Better Insurer Service Can Reduce Consumer Tolerance Schemes. Journal of Insurance Fraud in America, Fall 2011 (Year 2011).
Frey, Thomas. "192 Future Uses for Flying Drones", Business Trends, Sep. 2, 2014, p. 14 (111. Insurance Adjuster Drones, https://futuristspeaker.com/business-trends/192-future-uses-for-flying-drones/ (Year 2014).
How do Body Shop Estimates Affect Car Insurance Claims? Car Insurance Quotes.com, Aug. 19, 2013 (2 pp.). Year 2013).
U.S. Appl. No. 16/170,197, Tofte et al., filed Oct. 25, 2018.
U.S. Appl. No. 16/509,631, Tofte et al., filed Sep. 18, 2015.
Office Action for U.S. Appl. No. 14/858,034, dated Apr. 3, 2018.
Office Action for U.S. Appl. No. 14/858,034, dated Jul. 26, 2018.
Office Action for U.S. Appl. No. 14/858,034, dated Dec. 14, 2018.
Office Action for U.S. Appl. No. 14/858,034, dated May 30, 2019.
U.S. Appl. No. 17/977,999 Nonfinal Office Action, dated Feb. 9, 2023.

* cited by examiner

DISASTER DAMAGE ANALYSIS AND LOSS MITIGATION IMPLEMENTING UNMANNED AERIAL VEHICLES (UAVs)

CROSS REFERENCE TO RELATED APPLICATIONS

This application is a continuation of and claims priority to U.S. application Ser. No. 14/858,034 filed on Sep. 18, 2015, entitled "Disaster Damage Analysis and Loss Mitigation Implementing Unmanned Aerial Vehicles (UAVs)," which claims the benefit of (1) U.S. Provisional Patent Application No. 62/053,519, entitled "Method of Implementing Unmanned Aerial Vehicles (UAVs)," filed Sep. 22, 2014, (2) U.S. Provisional Patent Application No. 62/209,963, entitled "Disaster Damage Analysis and Loss Mitigation Implementing Unmanned Aerial Vehicles (UAVs)," filed Aug. 26, 2015, (3) U.S. Provisional Patent Application No. 62/207,421 entitled "Insurance Underwriting and Re-Underwriting Implementing Unmanned Aerial Vehicles (UAVs)," filed Aug. 20, 2015, (4) U.S. Provisional Patent Application No. 62/207,127 entitled "Accident Reconstruction Implementing Unmanned Aerial Vehicles (UAVs)," filed Aug. 19, 2015, (5) U.S. Provisional Patent Application No. 62/209,755 entitled "Systems and Methods of Utilizing Unmanned Aerial Vehicles to Detect Insurance Claim Buildup," filed Aug. 25, 2015, (6) U.S. Provisional Patent Application No. 62/209,627 entitled "Systems and Methods for Using Data Collected from Unmanned Aerial Vehicles to Pre-Generate Claims for Insured Approval," filed Aug. 25, 2015, and (7) U.S. Provisional Patent Application No. 62/208,201 entitled "Loss Mitigation Implementing Unmanned Aerial Vehicles (UAVs)," filed Aug. 21, 2015, the disclosure of each of which is hereby expressly incorporated by reference herein in its entirety.

FIELD OF THE DISCLOSURE

The present embodiments relate generally to applications of unmanned aerial vehicles (UAVs) or drones. More specifically, the present embodiments relate to using data collected by one or more UAVs to detect an imminent catastrophe that is about to occur, prevent a catastrophe from occurring, and/or mitigate the damage caused by a catastrophe. The present embodiments may also include the use of UAVs to assess damage to property caused by a catastrophe and/or to use this data for insurance claim inspections and/or investigations.

BACKGROUND

Catastrophes cause a great deal of damage to property each year. When the property is covered by an insurance policy, the insurer is obligated by the insurance contract to pay the valid insurance claims associated with the insured event. Conventionally, detecting an upcoming catastrophe, such as a storm, requires a great deal of human intervention and/or requires that people listen to and heed advance warnings by taking the necessary precautions. Furthermore, once damage is caused, assessing this damage often requires insurance adjusters to visit the property, resulting in arduous and time-consuming claim processing procedures.

The present embodiments may overcome these and/or other deficiencies.

BRIEF SUMMARY

Methods, systems, apparatus, and non-transitory computer-readable media are described that leverage the use of one or more unmanned aerial vehicles (UAVs, or "drones") for various catastrophe-related purposes. In some aspects, one or more UAVs may collect data in an attempt to predict the occurrence of a catastrophe and/or to mitigate the impact of a catastrophe once it has occurred. Once at the scene of catastrophe, one or more UAVs may collect drone data related to the catastrophe, such as images, video, weather conditions, etc. The one or more UAVs may be manually controlled and/or be configured to perform various tasks automatically and/or semi-automatically such that the damage to property caused by a catastrophe (or potential catastrophe) may be eliminated or mitigated.

In other aspects, the one or more UAV's may transmit drone data to an external computing device, which may be associated with an insurer and/or utilized by the insurer to begin and/or to facilitate an insurance claim process. An insurer may use the drone data to perform various insurance-related tasks, such as predicting the current risk to insured properties before a catastrophe has occurred, suggesting actions to take to reduce the current risk, adjust insurance pricing based upon the current risk, modify a premium price, update qualified discounts, assess damage caused by a catastrophe, detect fraudulent claims in excess of the actual cost of damages, etc.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The embodiments described herein discuss "catastrophes." Examples of catastrophes may include natural disasters, such as mudslides, storms, floods, hurricanes, tornadoes, earthquakes, wild fires, etc., as well as "man-made" or other disasters, such as traffic collisions, crashes, traffic events, fires, explosions, etc.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

DETAILED DESCRIPTION

I. System Overview

Figure 1:
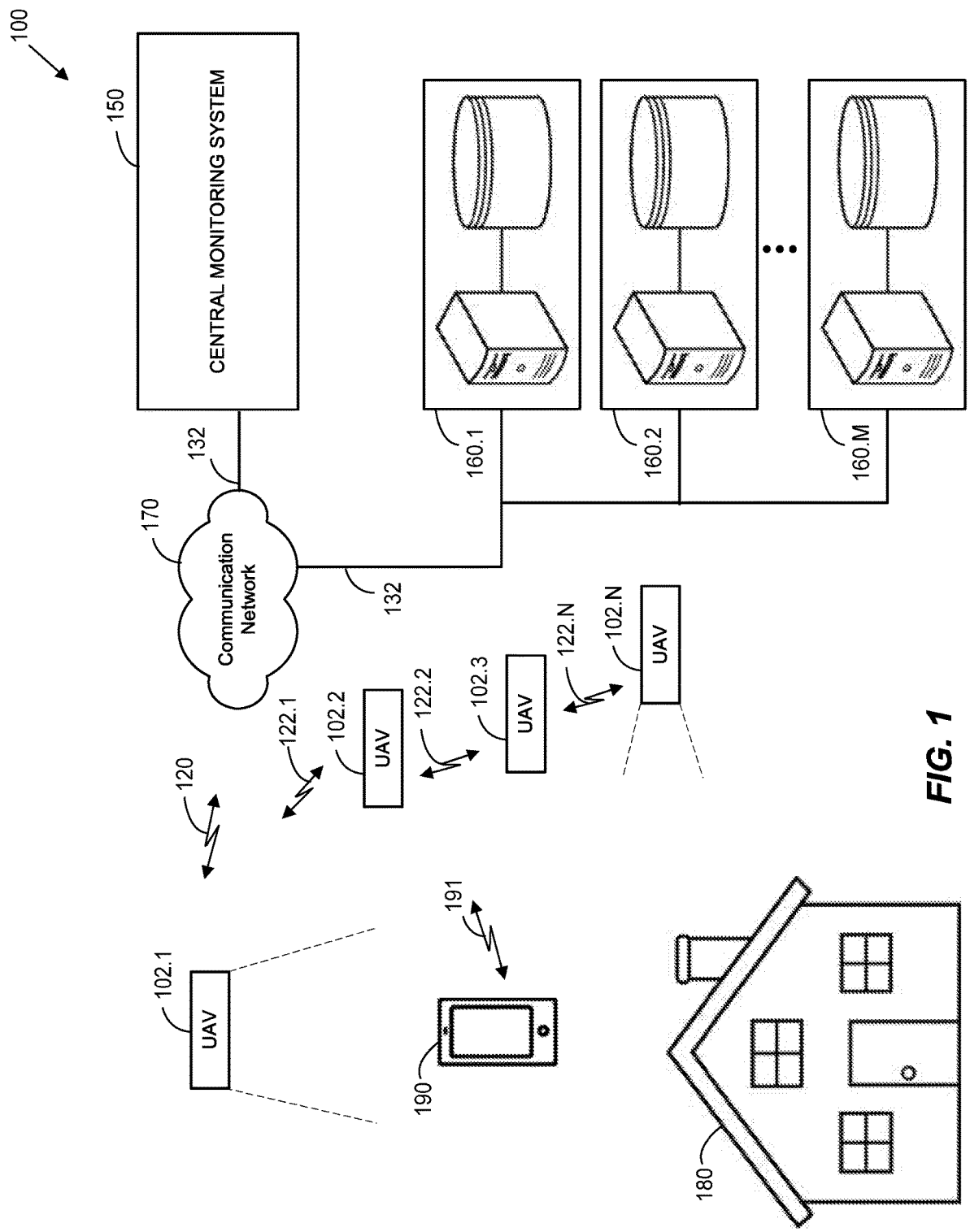
FIG. 1 illustrates an exemplary block diagram of a UAV data collection system 100.

FIG. 1 illustrates an exemplary block diagram of a UAV data collection system 100. UAV data collection system 100 may include any suitable number N of UAVs 102.1-102.N, a central monitoring system 150, any suitable number M of external computing devices 160.1-160.M, a communication network 170, a target location 180, and one or more mobile computing devices 190. UAV data collection system 100 may include additional, fewer, or alternate components, including those discussed elsewhere herein.

In various aspects, any suitable number of UAVs 102.1-102.N may communicate with one another and/or with communication network 170. One or more of UAVs 102.1-102.N may receive commands from other UAVs 102 and/or via communication network 170, process these commands, and execute one or more actions based upon these received commands. One or more of UAVs 102.1-102.N may also transmit data to other UAVs 102.1-102.N and/or to communication network 170.

As is further discussed below, by nature of the connectivity of central monitoring system 150 and external computing devices 160.1-160.M to communication network 170, UAVs 102.1-102.N, central monitoring system 150, external computing devices 160.1-160.M, and/or mobile computing device 190 may communicate with one another. For example, UAV 102.1 may communicate with communication network 170 via wireless link 120, while central monitoring system 150 and external computing devices 160.1-160.M may communicate with communication network 170, and one another, via wired links 132. To provide another example, mobile computing device 190 may communicate with communication network 170 via wireless link 191 to send data to and receive data from other devices, such as UAVs 102.1-102.N, central monitoring system 150, and/or external computing devices 160.1-160.M, for example, directly and/or via communication network 170.

Communications between UAVs 102.1-102.N, central monitoring system 150, external computing devices 160.1-160.M, and/or mobile computing device 190 may occur with or without communications via communication network 170, in some aspects. For example, UAVs 102.1-102.N may communicate with one another directly via wireless links 122.1-122.N, as shown in FIG. 1.

In various aspects, communications between one or more of UAVs 102.1-102.N, central monitoring system 150, one or more of external computing devices 160.1-160.M, and/or mobile computing device 190 may occur in accordance with any suitable number and/or type of communication protocols, which may be wireless communication protocols, wired communication protocols, or any combination thereof. Furthermore, in various aspects, UAVs 102.1-102.N, central monitoring system 150, external computing devices 160.1-160.M, and/or mobile computing device 190 may communicate with one another and/or with communication network 170 using the same or different types of communication protocols.

For example, one or more of UAVs 102.1-102.N may communicate with one another using a short-range wireless communication protocol, such as Wi-Fi protocol, but communicate with communication network 170, and hence with central monitoring system 150 and/or external computing devices 160.1-160.M, via a cellular protocol. To provide another example, central monitoring system 150 and/or external computing devices 160.1-160.M may communicate with communication network 170, and hence with one another, via an Ethernet protocol.

In some aspects, one or more of UAVs 102.1-102.N may communicate with one another to perform tasks as an intelligent group, thereby acting as and communicating with one another as a drone swarm. In other aspects, one or more of UAVs 102.1-102.N may be controlled individually by other UAVs 102.1-102.N, by central monitoring system 150, by one or more external computing devices 160.1-160.M, and/or mobile computing device 190. Individual control of one or more of UAVs 102.1-102.N may be implemented, for example, via a unique UAV address, a unique frequency channel, a unique code (e.g., a pseudo noise code (PN code) or a pseudo random noise code (PRN code), etc.

As will further discussed below, one or more UAVs 102.1-102.N may execute any suitable action based upon a particular application and/or command that is received by one or more UAVs 102.1-102.N and/or execute any suitable action autonomously or semi-autonomously. For example, one or more UAVs 102.1-102.N may navigate to location 180 to perform various actions, such as taking pictures from various vantage points, recording video data and/or transmitting live video, and/or collecting sensory data associated with location 180, which may be the location of one or more houses or other dwellings, a location of an imminent catastrophe, a location associated with where a catastrophe has recently occurred, etc.

In various aspects, one or more UAVs 102.1-102.N may be implemented as any suitable type of UAV or drone. For example, one or more UAVs 102.1-102.N may be equipped with any suitable number of propellers, wings, and/or engines to facilitate sustained flight, maneuvering, and/or the execution of various tasks as further discussed herein. For example, one or more UAVs 102.1-102.N may be implemented as quadracopters, flying wings, other types of drones, etc., and may utilize any suitable type of navigation and/or maneuvering control, such as collision-avoidance systems, detect-and-avoid systems, etc.

Communication network 170 may include any appropriate combination of wired and/or wireless communication networks. Communication network 170 is shown in FIG. 1 as a single network for purposes of brevity, but may represent more than one type of network and/or an aggregation of several networks.

For example, communication network 170 may include any combination of satellites, a local area network (LAN), a metropolitan area network (MAN), a wide area network (WAN), public switched telephone networks (PSTN), etc., and may facilitate a connection to the Internet for one or more devices communicatively coupled thereto. To provide further examples, communication network 170 may include wired telephone and/or cable hardware, satellite, cellular phone communication networks, etc.

Central monitoring system 150 may be implemented as any suitable device configured to communicate with, command, and/or control one or more UAVs 102.1-102.N. Furthermore, central monitoring system 150 may be implemented as any suitable device configured to receive data from one or more UAV's 102.1-102.N, and to share this data or otherwise make this data available to central monitoring system 150 and/or one or more external computing devices 160.1-160.M.

In some aspects, central monitoring system 150 may be configured to communicate with, command, and/or control one or more UAVs 102.1-102.N individually or in accordance with a UAV swarm protocol. For example, UAVs 102.1-102.N may include a hierarchy of UAVs in which some of UAVs 102.1-102.N may act as "mothership" UAV and exert control over other UAVs. Aspects include central monitoring system 150 communicating with, commanding, and/or controlling one or more of UAVs 102.1-102.N in accordance with any suitable combination of direct control and/or swarm control techniques.

In various aspects, central monitoring system 150 may be implemented as, for example, one or more computers or mobile devices (such as laptops, smartphones, tablet computers, netbooks, notebooks, phablets, wearable electronic devices, smart glasses, etc.). In one aspect, central monitoring system 150 may be implemented as one or more specialized components configured to monitor and/or control one or more UAVs 102.1-102.N. For example, central monitoring system 150 may be implemented as a computerized system configured to dispatch one or more UAVs 102.1-102.N, to command one or more UAVs 102.1-102.N to perform various tasks, to navigate one or more UAVs 102.1-102.N to a specific geographic location for repairs, recharging, and/or refueling, etc.

In some aspects, central monitoring system 150 may function automatically or semi-automatically with no user intervention or minimal user intervention, respectively. For example, central monitoring system 150 may be implemented with one or more computing devices that are programmed to receive instructions from mobile computing device 190 and/or one or more external computing devices 160.1-160.M, and to command, control, and/or communicate with one or more UAVs 102.1-102.N based upon these instructions.

In other aspects, central monitoring system 150 may be staffed with personnel trained to command, control, and/or communicate with one or more UAVs 102.1-102.N based upon a particular scenario or application. For example, homeowner may call or otherwise report (e.g., via mobile computing device 190) that her home has been damaged after a catastrophe has occurred. Trained personnel may utilize one or more computing devices implemented by central monitoring system 150 to dispatch one or more UAVs 102.1-102.N to location 180 to collect data, to receive data from one or more UAVs 102.1-102.N, to make this data available to one or more external computing devices 160.1-160.M for one or more insurance-related purposes.

To provide another example, trained personnel (or one or more UAVs 102.1-102.N) may monitor weather reports or other warning systems associated with the prediction of a catastrophe taking the form of some natural disaster (e.g., a tornado, hurricane, thunderstorm, earthquake, etc.). In some aspects, if this data indicates that a catastrophe is imminent, the trained personnel may dispatch one or more UAVs 102.1-102.N to the relevant location (e.g., location 180). In other aspects, one or more UAVs 102.1-102.N may automatically or semi-automatically react to the data to navigate to a location associated with an imminent catastrophe.

In accordance with aspects in which one or more UAVs 102.1-102.N arrive at the scene of a catastrophe before the catastrophe occurs, one or more UAVs 102.1-102.N may perform various acts in an attempt to mitigate or reduce the damage to property, provide assistance to people, etc., which is further discussed below with respect to FIG. 2.

One or more computing devices 160.1-160.M may be implemented as any suitable number and/or type of computing devices configured to utilize drone data collected from one or more UAVs 102.1-12.N to perform various insurance-related calculations, assess damage to property, perform property inspections and/or claim investigations, and/or to notify emergency response personnel when necessary. The use of collected drone data by an insurer for various insurance-related purposes is further discussed below with reference to FIG. 4.

In one aspect, one or more computing devices 160.1-160.M may be part of an insurer computing system, and as such may access insurer databases, algorithms, applications, remote servers, remote processors, etc., as needed to perform insurance-related functions. To provide another example, one or more computing devices 160.1-160.M may access traffic video data, weather data, various private and/or municipal surveillance systems access various security monitoring systems, etc.

In various aspects, one or more UAVs 102.1-102.N, central monitoring system 150, one or more computing devices 160.1-160.M, and/or mobile computing device 190 may share one or more functions such that either of one or more UAVs 102.1-102.N, central monitoring system 150, one or more UAVs 102.1-102.N, and/or mobile computing device 190 may perform any portion (or all) of the functions otherwise performed by the other components. Furthermore, functions may be performed by one or more UAVs 102.1-102.N, central monitoring system 150, one or more computing devices 160.1-160.M, and/or mobile computing device 190 working in concert with one another.

For example, as will be further discussed herein, one or more UAVs 102.1-102.N may analyze collected drone data locally or transmit the drone data to central monitoring system 150 and/or one or more of external computing devices 160.1-160.M for further analysis, thereby offloading these tasks.

To provide additional examples, in some aspects, central monitoring system 150 and/or one or more computing devices 160.1-160.M may perform the same functions as one another in some aspects, while performing separate, dedicated functions in other aspects. That is, the command, control, and communication functions performed by central monitoring system 150 may be alternatively or additionally performed by one or more computing devices 160.1-160.M. Furthermore, insurance-related functions performed by one or more computing devices 160.1-160.M may be alternatively or additionally performed by central monitoring system 150.

To provide yet another example, one or more of UAVs 102.1-102.N may function as a central monitoring system, performing command, control, and communication functions over other UAVs 102.1-102.N. These aspects may be particularly useful when one or more of UAVs 102.1-102.N is configured to navigate and communicate with one another in accordance with a swarm protocol.

II. Exemplary UAV or Drone

Figure 2:
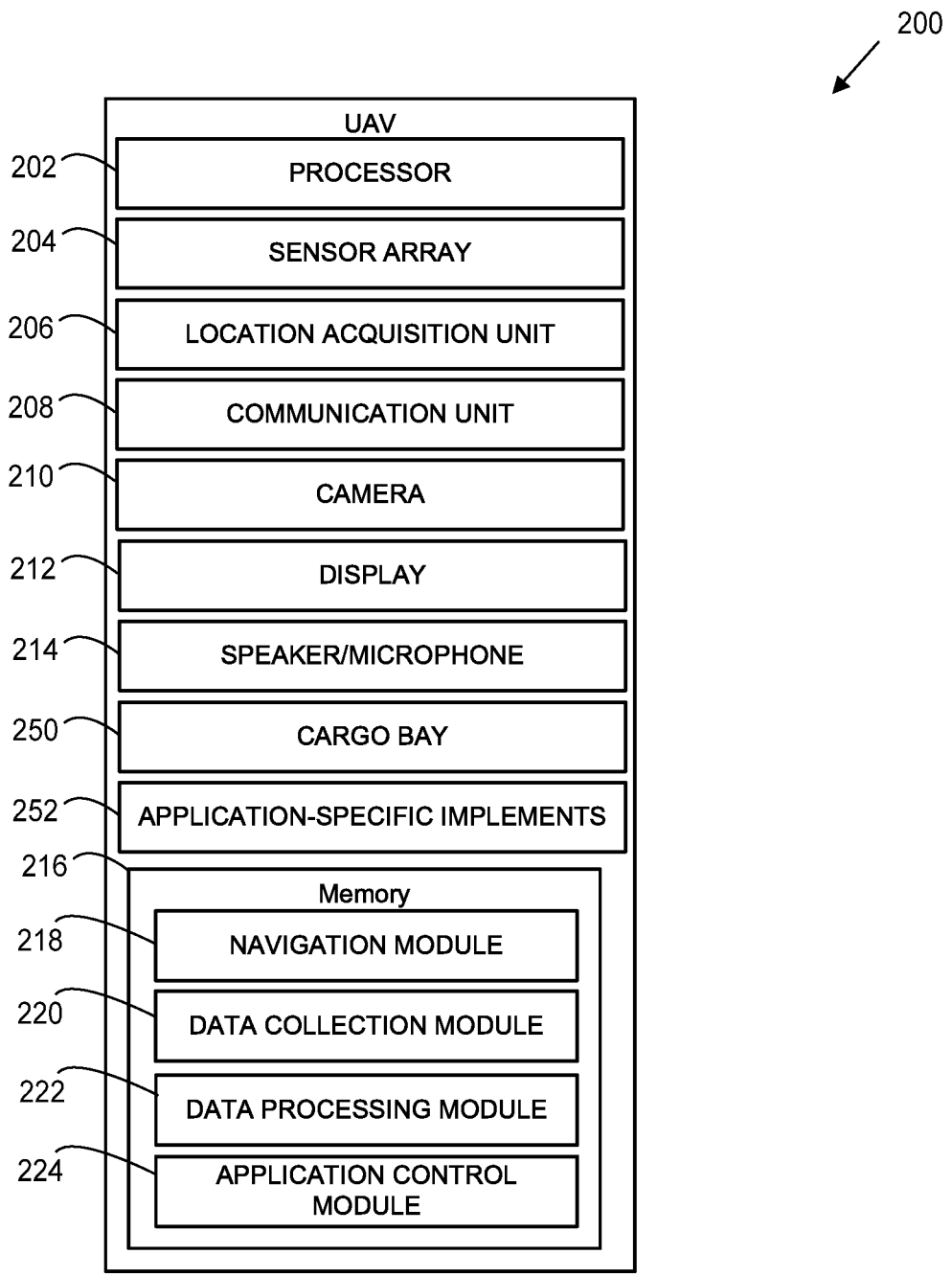
FIG. 2 illustrates an exemplary block diagram of a UAV 200.

FIG. 2 illustrates an exemplary block diagram of a UAV 200. UAV 200 may include a processor 202, a sensor array 204, a location acquisition unit 206, a communication unit 208, a camera 210, a display 212, a speaker/microphone 214, a cargo bay 250, application-specific implements 252, and a memory 216. In one aspect, UAV 200 is an implementation of one of UAVs 102.1-102.N, as shown in FIG. 1. UAV 200 may include additional, fewer, or alternate components, including those discussed elsewhere herein.

Processor 202 may be implemented as any suitable type and/or number of processors, such as a host processor of UAV 200, for example. To provide additional examples, processor 202 may be implemented as an application specific integrated circuit (ASIC), an embedded processor, a central processing unit (CPU) associated with UAV 200, a graphical processing unit (GPU), etc.

Processor 202 may be configured to communicate with one or more of sensor array 204, location acquisition unit 206, communication unit 208, camera 210, display 212, speaker/microphone 214, cargo bay 250, application-specific implements 252, and/or memory 216 via one or more wired and/or wireless interconnections, such as any suitable number of data and/or address buses, for example. These interconnections are not shown in FIG. 2 for purposes of brevity.

Processor 202 may be configured to operate in conjunction with one or more of sensor array 204, location acquisition unit 206, communication unit 208, camera 210, display 212, speaker/microphone 214, cargo bay 250, application-specific implements 252, and/or memory 216 to process and/or analyze data, to store data to memory 216, to retrieve data from memory 216, to cause instructions, alerts and/or notifications to be displayed via display 212 and/or to be sounded via speaker/microphone 214, to receive, process, and/or interpret communications, commands, and/or controls received via communication unit 208, to receive, process, store, and/or interpret data measured and/or generated via sensor array 204, to receive, store, and/or transmit images and/or video captured via camera 210, to execute one or more functions related to the navigation of UAV 200, to receive data from and/or send data to one or more devices (e.g., central monitoring system 150, mobile computing device 190, one or more of UAVs 102.1-102.N, one or more of external computing devices 160.1-160.M, etc.), to deploy one or more devices from cargo bay 250 to detect catastrophes, to prevent damage caused by catastrophes, and/or to mitigate damage caused by catastrophes, to perform one or more actions via application specific implements 252 to detect, prevent, and/or mitigate damage from a catastrophe, etc.

Sensor array 204 may be configured to collect information in accordance with any suitable number of implemented sensors, to store the collected information as drone data in any suitable portion of memory 216, and/or to transmit the drone data to one or more of central monitoring system 150, another UAV (e.g., one or more of UAVs 102.1-102.N), and/or one or more of external computing devices 160.1-160.M.

Sensor array 204 may be implemented as any suitable number and/or type of sensors configured to measure, monitor, and/or quantify one or more characteristics of UAV 200's environment as part of the collected drone data.

Examples of suitable sensor types implemented by sensor array 204 may include one or more accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, smoke detectors, heat sensors, infrared sensors, motion detectors, Light Detection and Ranging (LiDAR) sensors, ground penetrating radio detection and ranging (RADAR), cameras, video or audio recorders, etc. Sensor array 204 may additionally or alternatively include advanced sensors, for example, that detect and/or receive data associated with temperature measurements, soil moisture, thermal imaging, weather conditions, etc.

Location acquisition unit 206 may be implemented as a satellite navigation receiver that works with a global navigation satellite system (GNSS) such as the global positioning system (GPS) primarily used in the United States, the GLONASS system primarily used in the Soviet Union, the BeiDou system primarily used in China, and/or the Galileo system primarily used in Europe.

Location acquisition unit 206 and/or processor 202 may be configured to receive navigational signals from one or more satellites and to calculate a geographic location of UAV 200 using these signals. Location acquisition unit 206 may include one or more processors, controllers, or other computing devices and memory to calculate the geographic location of UAV 200 without processor 202, or location acquisition unit 206 may utilize components of processor 202. Thus, processor 202 and location determining component 206 may be combined or be separate or otherwise discrete elements.

Although aspects of UAV 200 may include a satellite navigation receiver, any suitable location-determining technology may be used. For example, communication unit 208 may determine the location of UAV 200 by receiving data from transmitter locations and then performing basic triangulation calculations to determine the relative position of UAV 200 with respect to the transmitting locations. For example, cellular towers or any customized transmitting radio frequency towers may be used instead of, or in addition to, satellites.

Communication unit 208 may be configured to support any suitable number and/or type of communication protocols to facilitate communications between UAV 200 and one or more other devices, such as one or more of central monitoring system 150, another UAV (e.g., one or more of UAVs 102.1-102.N), one or more of external computing devices 160.1-160.M. and/or mobile computing device 190, for example, as shown in FIG. 1. Communication unit 208 may be configured to send and receive data directly and/or indirectly (e.g., via communication network 170).

Communication unit 208 may be configured to receive any suitable type of information via one or more of central monitoring system 150, another UAV (e.g., one or more of UAVs 102.1-102.N), one or more of external computing devices 160.1-160.M, and/or mobile computing device 190. Furthermore, communication unit 208 may likewise be configured to transmit any suitable type of information to one or more of central monitoring system 150, another UAV (e.g., one or more of UAVs 102.1-102.N), one or more of external computing devices 160.1-160.M, and/or mobile computing device 190. Communication unit 208 may be implemented with any suitable combination of hardware and/or software to facilitate this functionality. For example, communication unit 208 may be implemented having any suitable number of wired and/or wireless transceivers, ports, connectors, antennas, etc.

Camera 210 may be configured to capture one or more digital images and/or video data. For example, camera 210 may capture, store (e.g., in a suitable portion of memory 216), and/or transmit images associated with damage caused by a catastrophe, such as images of personal property (e.g., a vehicle), one or more portions outside of a building or structure, etc., before and/or after a catastrophe has occurred. This data may be part of the drone data transmitted to other devices via communication unit 208. In various aspects, camera 210 may include any suitable combination of hardware and/or software such as image sensors, optical stabilizers, image buffers, frame buffers, charge-coupled devices (CCDs), complementary metal oxide semiconductor (CMOS) devices, etc., to facilitate this functionality.

Camera 210 may be coupled to one or more servos that are controlled via processor 202 to obtain images and/or video from one or more locations, such as location 180, for example, as shown in FIG. 1. Camera 210 may include any suitable number of cameras, which may include cameras that capture image data in both the visible and the non-visible spectrum, such as digital and thermal imaging cameras, for example.

Display 212 may be configured to display one or more images, messages, instructions, etc., in response to data received from processor 202. Display 212 may be implemented as any suitable type of display, and may facilitate user interaction with UAV 200. For example, display 212 may be implemented as a capacitive touch screen display, a resistive touch screen display, a standard display (a non-touch display), etc. In various aspects, display 212 may be configured to work in conjunction with processor 202 to detect user inputs upon a user selecting a displayed interactive icon or other graphic, to identify user selections of objects displayed via display 212, to display instructions and/or prompts to facilitate collecting information and/or images associated with a vehicle collision or crash, etc. Additionally or alternatively, information displayed via display 212 may be in the form of audible announcements made via speaker/microphone 214.

Cargo bay 250 may be configured to provide storage space for UAV 200. As will be further discussed below, UAV 200 may deliver, distribute, and/or drop various objects in various aspects. Cargo bay 250 may provide a storage area where such objects may be stored during flight. Cargo bay 250 may be insulated, pressurized, coated, and/or environmentally controlled to protect and/or stabilize the objects during flight. Furthermore, cargo bay 250 may include one or more bay portions such that different types of objects may be carried in each of the different portions. Cargo bay 250 may include any suitable number of actuators, servos, etc., that may be controlled via processor 202 to deploy carried cargo. For example, processor 202 may cause one or more cargo bay doors associated with cargo bay 250 to open and deploy one or more objects carried by UAV 200.

Application-specific implements 252 may be configured to store any suitable number of instruments to collect data and/or to perform specific functions in accordance with various applications. For example, application-specific implements 252 may store specialized instrumentation that may not be included as part of sensor array 204. This could be, for example, when the specialized equipment is too large, when the specialized equipment is too expensive to mass produce for each UAV, etc. In this way, UAV 200 may carry specialized equipment in application-specific implements 252 for applications that require it and otherwise not utilize the specialized equipment.

UAV 200 may carry a specific number and/or type of specialized equipment in application-specific implements 252 depending on the particular function that UAV 200 is to partake. Examples of equipment carried in application-specific implements 252 may include, for example, soil sample extractors (e.g., coring tools), spectrometers, volumetric water content sensors, specialized biometric sensors, soil-testing equipment, specialized imaging equipment, etc.

Additionally or alternatively, application-specific implements 252 may include any suitable number and/or type of actuators, deployment systems, and/or equipment configured to execute an action in accordance with a particular function performed by UAV 200. Examples of the equipment included as part of application-specific implements 252 may include drills, shovels, beacons, sandbags, firefighting equipment, barricades, barriers to redirect water flow and/or mudflows, flares, smoke generating systems, tethers, signaling systems, etc. Examples of systems implemented in accordance with the equipment included as part of application-specific implements 252 may include any suitable type of deployment system associated with the equipment that is used for a particular application, such as mounts, lifts, doors, nozzles, chutes, tubing, winches, etc.

In accordance with various aspects, memory 216 may be a computer-readable non-transitory storage device that may include any suitable combination of volatile memory (e.g., a random access memory (RAM) or non-volatile memory (e.g., battery-backed RAM, FLASH, etc.). Memory 216 may be configured to store instructions executable on processor 202, such as the various memory modules illustrated in FIG. 2 and further discussed below, for example. These instructions may include machine readable instructions that, when executed by processor 202, cause processor 202 to perform various acts as described herein.

Navigation module 218 is a region of memory 216 configured to store instructions that, when executed by processor 202, cause processor 202 to perform various acts in accordance with applicable aspects as described herein.

In one aspect, navigation module 218 may be a portion of memory 216 configured to store instructions, that when executed by processor 202, cause processor 202 to control the speed, direction, route, and/or altitude of UAV 200. For example, executable instructions stored in navigation module 218 may enable processor 202 to determine a destination specified as geographic location coordinates received as part of a command via communication unit 208, to determine a current geographic location of UAV 200 via location acquisition unit 206, and/or to execute the appropriate controls to maneuver UAV 200 to the destination.

To provide another example, navigation module 218 may be a portion of memory 216 configured to store instructions, that when executed by processor 202, cause processor 202 to issue a command to another UAV (e.g., one or more of UAVs 102.1-102.N), thereby causing that UAV to navigate to a particular geographic location.

In some embodiments, navigation of UAV 200 may be performed with the assistance of one or more persons controlling UAV 200. For example, personnel associated with central monitoring system 150 may use image and/or video captured by camera 210 as feedback and manually direct UAV 200. For example, a person may use a controller implemented by central monitoring system 150 that receives control inputs that are interpreted, translated, and transmitted as commands to UAV 200.

In other aspects, navigation may be performed by UAV 200 autonomously or with minimal assistance from one or more persons. For example, executable instructions stored in navigation module 218 may enable processor 202 to utilize image and/or video captured by camera 210 and to analyze the image and/or video in accordance with any suitable image recognition, object recognition, collision-avoidance, detect-and-avoid, and/or machine vision algorithms. UAV 200 may use the outcome of such analyses to complete a requested navigational task.

That is, in manually controlled aspects, UAV 200 may navigate to various locations when being controlled by a person via central monitoring system 150. However, in autonomous or semi-autonomous embodiments, UAV 200 may receive a command of a higher level structure, such as a command requesting UAV 200 to navigate to a particular distance from a particular geographic location identified in the video (e.g., one that is selected via a user through an appropriate user input gesture), in which case UAV 200 may carry out this task without further user assistance.

Data collection module 220 is a region of memory 216 configured to store instructions that, when executed by processor 202, cause processor 202 to perform various acts in accordance with applicable aspects as described herein.

In one aspect, data collection module 220 may be a portion of memory 216 configured to store instructions, that when executed by processor 202, cause processor 202 to collect data associated with one or more locations in which UAV 200 is dispatched or otherwise directed. Similar to the navigation processes described above, UAV 200 may likewise perform data collection processes manually, autonomously, or semi-autonomously. Again, the collected data may depend upon the particular application for which UAV 200 is utilized.

Regardless of how the data is collected, aspects include UAV 200 collecting drone data that is used to perform various tasks. These tasks and how the drone data is used for each of these tasks is further discussed below with reference to FIG. 4. The drone data may be collected, for example, via one or more of sensor array 204, location acquisition unit 206, camera 210, one or more objects deployed via cargo bay 250 and/or application-specific implements 252, etc.

For example, the collected drone data may be utilized by an insurer to assess the damage to a structure or other personal property covered by an insurance policy after a catastrophe has occurred. To provide another example, the collected drone data may be processed by UAV 200 and/or another computing device (e.g., central monitoring system 150) and result in UAV 200 independently executing and/or receiving a command that causes UAV 200 to execute one or more actions to prevent, control, and/or mitigate damage caused by a catastrophe, collect data for use by an insurer (which is further discussed below with reference to FIG. 4), etc. To provide yet another example, the collected data may include one or more images of a structure revealing vegetation that may pose a fire risk, images of the structure that reveal structural damage, soil moisture content data, etc.

To provide an illustrative example, UAV 200 may identify, via an object recognition algorithm stored in data collection module 220 and executed by processor 202, a location 180 that is associated with damage caused after a catastrophe has occurred. UAV 200 may identify location 180, for example, by correlating the current geographic location of UAV 200 (determined via location acquisition unit 206) to a geographic location received via a transmitted command.

Once at location 180, UAV 200 may capture images and/or video of a structure or other insured property that was damaged by a catastrophe, which may be of sufficient detail, resolution, and proximity such that the extent of the damage may later be adequately assessed by a person, one or more semi-automatic processes, and/or one or more automated processes used by an insurer.

Additionally or alternatively, a person controlling UAV 200 may transmit commands via central control system 150, for example, to remotely control UAV 200 and collect the desired drone data. For example, UAV 200 may be instructed to navigate to location 180 to collect images, video, soil moisture content data, etc., as drone data. The images may be, for example, aerial images of the roof of a structure, detailing the damage caused by a catastrophe. To provide another example, the drone data may include images of various sides of a structure and/or a vehicle damaged by a catastrophe.

Data processing module 222 is a region of memory 216 configured to store instructions that, when executed by processor 202, cause processor 202 to perform various acts in accordance with applicable aspects as described herein. Data processing module 222 may facilitate UAV 200 analyzing data collected by one or more of sensory array 204, location acquisition unit 206, communication unit 208, camera 210, one or more instruments carried in cargo bay 250, and/or application-specific implements 252.

In one aspect, data processing module may facilitate UAV 200 performing data analysis locally, while in other aspects, data processing module may offload the analysis of collected data to one or more other computing devices by transmitting collected data via communication unit 208.

Data processing module 222 may include instructions to analyze data in accordance with one or more specific functions performed by UAV 200. For example, as further described below, UAV 200 may capture images of property damage before and/or after a catastrophe has occurred. In such a scenario, processor 202 may execute instructions stored in data processing module 222 to analyze images captured by camera 210 to determine where the damage is, to take images most relevant to the assessment of damage, and/or to navigate close to the damaged property while taking images.

To provide another example, UAV 200 may be function to detect catastrophes, to prevent damage caused by catastrophes, and/or to mitigate damage caused by catastrophes. For example, UAV 200 may process weather-related data received via communication unit 208 to determine where a catastrophe is likely to occur (or has already occurred) and to navigate to this location.

Application control module 224 is a region of memory 216 configured to store instructions that, when executed by processor 202, cause processor 202 to perform various acts in accordance with applicable aspects described herein. Application control module 224 may facilitate UAV 200 performing a specific action in response to data collected by one or more of sensory array 204, location acquisition unit 206, communication unit 208, camera 210, one or more instruments carried in cargo bay 250, and/or application-specific implements 252.

Additionally or alternatively, application control module 224 may facilitate UAV performing a specific application based upon the result of data analyzed by processor 202 when executing instructions stored in data processing module 222. In various aspects, the instructions stored in application control module 224 may vary based upon what UAV is actually doing, and may have more than one specific application.

That is, processor 202 may execute instructions stored in application control module 224 to enable UAV 200 to make various decisions based upon the analysis of processed data, and to execute one or more actions based upon these decisions. This may include, for example, determining that the weather data (e.g., changes in temperature, barometric pressure, wind velocity, etc.) corresponds to a known profile prior to the occurrence of a catastrophe (e.g., a tornado, hurricane, severe thunderstorm, etc.), and causing UAV 200 to navigate to a particular location when a catastrophe is imminent.

To provide another example, processor 202 may execute instructions stored in application control module 224 to enable UAV 200 to decide, based upon an aerial image analysis, where to place barricades or other water-diverting objects prior to a heavy rainfall, thereby avoiding flooding in certain areas.

A. Catastrophe Response

As explained above, UAV 200 may perform a diverse range of operations via customization of the implementation of sensor array 204, the instruments carried in cargo bay 250, the implements included in application-specific implements 252, etc. Some of these operations may be particularly valuable to an insurer because they may act to reduce losses and/or damage to insured property by detecting a catastrophe before it occurs, and/or preventing or mitigating damage caused by a catastrophe. The following examples illustrate some of the functions that UAV 200 may perform along these lines, but are not intended to be limiting.

For example, one or more UAVs 200 may be utilized to assist in search and rescue operations. In accordance with such an aspect, UAV 200 may carry beacons (e.g., in cargo bay 250) that are configured to broadcast a geographic location in accordance with one or more communication protocols. The broadcasted location, which may be latitude and longitude coordinates, for example, may be received by emergency response personnel and used to assist in search and rescue operations. UAV 200 may utilize sensor array 204 to detect profiles, such as heat signatures, for example, corresponding to a person or an animal. An operator controlling UAV 200 (or UAV 200 itself) may view the heat signatures, confirm that a person has been found, and drop a beacon at this location. UAV 200 may carry a payload of several beacons in cargo bay 250 and drop beacons for each person that is found in this manner. In this way, UAV 200 may quickly scan a large area from the air to identify lost persons and signal emergency response personnel of their corresponding locations via beacon transmissions.

Because UAV 200 may be relatively small and capable of traversing an area quickly via the air, UAV 200 may advantageously access places where a person is trapped that would otherwise be inaccessible by search and rescue personnel. For example, a person could be trapped in a cave, a mine, in a building that is on fire, in a grain elevator, under debris, etc., but quickly identified via suitable sensors utilized by sensor array 204.

Additionally or alternatively, one or more UAVs 200 may deliver survival kits or other assistance (e.g., lighting) to people in a catastrophe situation. Survival kits may include necessary life prolonging items such as blankets, food, flashlights, medical supplies, water, first aid supplies, bandages, parachutes, zip lines, rope, sutures, a camera to facilitate the insured taking pictures of a damaged insured asset, etc. Since multiple UAVs 200 may carry more than one survival kit, in the event of a catastrophe, a number of UAVs 200 may be dispatched to quickly canvass an entire area proximate to the catastrophe, quickly disbursing supplies to those who need them while emergency response personnel continue with their rescue operations.

Since sensor arrays 204 may detect audio and video information, UAV 200 may facilitate communications between a contacted person in need of rescue and another person remotely located from their location, such as emergency response personnel, for example. Once a person is identified, UAV 200 may inform the person that help is on the way, ask the person the extent of her injuries, ask the person if additional medical supplies are needed, etc. In this way, UAV 200 may provide a person in need of rescue with a means to communicate with the outside world while a search and rescue team continues to locate the person, providing comfort and the necessary supplies that may extend the person's life.

In one aspect, UAV 200 may identify the extent of a person's injuries via sensor array 204. For example, UAV 200 may utilize one or more biometric sensors to identify a person's identity, their heart rate, body temperature, etc. Such an aspect may be particularly useful when, for example, an identified person is not responsive when identified by UAV 200. Based upon biometric information, UAV 200 may assess a disaster scene to identify which persons are most injured and/or most in need of immediate assistance. By transmitting this information along with identifying images of each person to emergency response personnel, time may be saved by allowing the emergency responders to quickly provide assistance to those who need it most without having to assess the situation themselves upon their arrival on the scene.

Additionally or alternatively, UAV 200 may assist people before, during, or after a catastrophe has occurred. For example, UAV 200 may detect a catastrophe that is imminent or already occurring. UAV 200 may display instructions via display 212 and/or play audible instructions via speaker/microphone 214 informing persons impacts by the catastrophe how to respond to a natural disaster, where to go and/or what to do, information as to the extent of the natural disaster, etc.

UAV 200 may locate persons trapped at a location based upon profiling and/or sensory data. For example, processor 202 may execute instructions stored in data processing module 222 to detect persons by matching detected movement to a motion profile. This profile could include, for example, a person flailing her arms, being totally still or not moving, cradling an appendage, etc. UAV 200 may use motion profile data in addition to, or as an alternative to, sensory data such as thermal imaging, for example, to locate persons who are trapped. In accordance with such aspects, UAV 200 may transmit images, a location of the person, and any other suitable type of information to assist emergency response personnel to locate and extricate the trapped persons. Such aspects may be particularly useful, for example, when persons are trapped at remote locations or locations that are not otherwise easily traversed by a person, such as rugged terrain, harsh environments, ongoing wildfires, etc.

Additionally or alternatively, once an immediate threat of a catastrophe has passed, various aspects include UAV 200 assisting people to recover from the effects of the catastrophe. In one aspect, UAV 200 may help people record damage of the catastrophe for insurance claim purposes by delivering cameras or other imaging devices to identified persons to provide them with a way of documenting damage and sending these images to their insurer. Because the course of time impacts the accuracy of damage assessment, quickly providing the insured with a way to document the damage allows an insurer to better estimate the extent of the damage, and/or the cost of repairing or replacing damaged assets, soon after a catastrophe has occurred.

In one aspect, UAV 200 may be deployed to assess the damage caused to a structure, such as a house, for example, as a result of a catastrophe. For example, UAV 200 may record images of various views above and/or next to a house, save these images, and/or transmit these images to one or more external computing devices (e.g., central monitoring system 150 and/or external computing devices 160.1-160.M). Using these images, damage to siding, windows, roofing, structural elements of a building, etc., may be determined without sending a person to the location to do so.

In another aspect, UAV 200 may assess property damage or other types of environmental damage as a result of a catastrophe. For example, UAV 200 may store and/or transmit images of environmental damage caused by rain, ice storms, hail, lightning, flooding, earthquakes, wildfires, etc., to the appropriate personnel. Based upon this information, the personnel may take appropriate action based upon the type of and severity of the damage. That is, power line damage may be remedied by local utility company personnel, while fallen trees or braches may be addressed by the appropriate municipal entity.

In yet another aspect, UAV 200 may be deployed to assess the status of repairs that are performed, for example, as a result of damage caused by a catastrophe. For example, images stored and/or transmitted by UAV 200 to another device may be used to monitor the status of construction or other repairs and/or to determine whether the appropriate construction permits have been requested, issued, and/or displayed at the construction site. If this status is used as part of an insurance claim, these images may alternatively or additionally be used as part of an automated or semi-automated process that provides an insured with access to this information. That is, a status bar or other type of status indicator on an insurer website may be updated, manually, automatically, or semi-automatically through the assessment of images collected via UAV 200 from a repair location.

In still other aspects, UAV 200 may be deployed to assess the costs of mitigating efforts used by an insured customer so that these costs may be appropriately reimbursed. That is, insurance contracts typically cover efforts to mitigate potentially continuing damage once initial damage has occurred. For example, if a wind storm blows all the shingles off of a roof and the insured customer purchases and installs a tarp to prevent a future storm from dumping rain into the building or structure until such time as a roofer can repair the damage, insurers will typically reimburse the customer for the cost of the tarp and installation. In accordance with one aspect, UAV 200 may collect data that is assessed by the insurer to assess not only the extent of the damage, but the extent and/or cost of an insured customer's efforts to mitigate that damage after the catastrophe has occurred.

In some aspects, the various UAV functions may be performed by UAVs maneuvering with or without a tethered system. For example, in some aspects, one or more UAVs may fly untethered to carryout various functions such as providing temporary lighting, for example. In other aspects, however, one or more UAVs may utilize a tethering system while flying (or other means of locomotion) within a radius governed by the length of the tether. Such tethering systems may be particularly useful, for example, when higher power requirements are required, such that one or more UAVs may receive power via the tether instead of draining their respective internal batteries.

B. Catastrophe Detection, Control, Prevention, and Damage Mitigation

In some aspects, UAV 200 may be deployed to assist in the control, detection, and/or mitigation of a catastrophe. UAV 200 may be deployed to the site where a catastrophe has occurred, such as a structure or building fire or a wildfire, for example, to provide firefighting assistance. Firefighting assistance may include, for example, starting strategic "snuff out" fires, starting a fire to create a fire break, cutting trees, removing material that serves as fuel for the fire, directing water or other fire suppressing chemicals, holding a fire hose or watering equipment used to spray water onto the fire, deploying an apparatus to provide the emergency response personnel assistance with evacuation of one or more people from the structure or building that is on fire, etc. Since UAV 200 may withstand higher temperatures than firefighting personnel, this advantageously allows UAV 200 to provide firefighting assistance where no person may safely travel, such as at a center of a fire.

Additionally or alternatively, UAV 200 may work in conjunction with other parties and/or devices to detect, control, and/or prevent a catastrophe. For example, UAV 200 may receive commands from another device (e.g., a mobile computing device), which may be operated by emergency personnel such as police, firefighters, paramedics, ambulance drivers, etc. These commands may be sent by the device operated by emergency personnel when the emergency personnel and/or their device detects an imminent or currently occurring catastrophe. In response to receipt of these commands, UAV 200 may respond with a confirmation message, navigate to a requested location (which may be included in the commands transmitted by the device and may be the same location as the other device), etc.

To provide another example of UAV 200 working in conjunction with emergency response personnel, UAV 200 may arrive at the scene of a catastrophe before emergency response personnel, and determine and continue to monitor a location between UAV 200 and an emergency response vehicle such as an ambulance, for example. UAV 200 may monitor this information, for example, via communications with emergency vehicles or devices located in such vehicles (e.g., mobile computing devices). Upon the monitored vehicle being within a threshold distance between UAV 200, UAV 200 may transmit, as part of collected data from the scene of the catastrophe, relevant information that may be used by emergency response personnel (e.g., number of vehicles, the condition of injured persons, whether a fire is present, etc.) upon arriving at the scene of the catastrophe. Additionally or alternatively, UAV 200 may communicate with emergency vehicles or devices located in such vehicles to provide directions or other instructions to route the emergency responders to a location where they are needed.

To provide yet another example, UAV 200 may collect data and/or monitor animal population densities that may pose a risk, for example, to drivers on the road near such dense populations. UAV 200 may analyze thermal images and/or other types of images to determine that a particular animal population density is in excess of a certain threshold. If so, aspects include UAV 200 transmitting a warning or other suitable notification to mobile computing devices and/or other devices in proximity to such dense animal clusters. In this way, UAV 200 may warn persons of high densities of animals posing threats to drivers and help drivers to avoid collisions with animals near roadways.

UAV 200 may carry specialized equipment (e.g., in cargo bay 250) to prevent catastrophes, such as floods, for example, when such conditions are detected. For example, UAV 200 may receive meteorological warning information indicating that flood conditions are imminent, and deploy barriers via spraying a material that subsequently hardens and/or solidifies, deploy sandbags, etc., to redirect water flow from areas associated with high water levels during such conditions.

In one aspect, UAV 200 may be configured to determine a severity level associated with a disaster situation that has been caused by, or is predicted to be caused by, the occurrence of a catastrophe. For example, UAV 200 may utilize one or more collected sensor metrics such as wind speed, barometric pressure, rainfall amount, etc., and create a disaster severity indicator. The disaster severity scale may be any suitable scaled system to indicate a level of severity based upon such parameters, such as a scale of 1-10 with 10 being the most severe, for example. UAV 200 may transmit the disaster severity level to another device (e.g., central monitoring system 150 and/or external computing devices 160.1-160.M), so emergency response personnel may prepare accordingly.

In various aspects, images or other sensory data collected by UAV 200 may help identify and/or prevent an occurrence of a catastrophe. For example, UAV 200 may transmit images to one or more UAVs 102, external computing devices (e.g., central monitoring system 150 and/or external computing devices 160.1-160.M). These devices may be monitored by the appropriate personnel to identify high risks for potential catastrophes such as, for example, imminent mudslides, sinkholes, avalanches, etc. Based upon this information, personnel may take the appropriate action of closing areas that may be impacted by removing mud, snow, or other materials to attempt to prevent the catastrophe from occurring. Additionally or alternatively, UAV may autonomously or semi-autonomously make these decisions and/or take the appropriate action.

UAV 200 may be configured to detect whether a catastrophe is imminent based upon an analysis of images and/or other sensory readings taken at one or more locations. Additionally or alternatively, UAV 200 may transmit this information to another external computing device (e.g., central monitoring system 150 and/or external computing devices 160.1-160.M), and these devices may determine whether a catastrophe is imminent based upon the information collected by UAV 200.

For example, UAV 200 may analyze images, barometric pressure, temperature fluctuations, etc., to determine whether an occurrence of a natural catastrophe within a period of time after the information is collected exceeds a probability threshold. This probability threshold may include any suitable threshold based upon a weighted combination, average, or other identifiable combination identifying a probability of a catastrophe occurring from the analysis of the collected information. Once the threshold is exceeded, UAV 200 may transmit an indication of this as a warning notification to an external computing device (e.g., central monitoring system 150 and/or external computing devices 160.1-160.M).

C. Facilitating Insurance Claim Inspection or Investigation

In some aspects, UAV 200 may be deployed to collect information that may be utilized for insurance claim inspections and/or investigations. In one aspect, UAV 200 may collect information such as images, for example, to determine the extent of damage caused by a catastrophe. An insurer may then use this information to estimate damages caused in an area proximate to the location in which the images were taken by UAV 200 and/or to set a reserve amount of money in an insurer account based upon this estimate. In this way, an insurer will be better prepared when claims are filed to pay out on these claims.

Once deployed, UAV 200 may collect data from various locations before and after the occurrence of a catastrophe. That is, UAV 200 may periodically collect information from one or more locations regardless of whether a catastrophe is about to occur. Then, when a catastrophe does occur, UAV 200 may collect post-catastrophe images or other information. The pre-catastrophe and post-catastrophe images or other information may be sent to another device (e.g., central monitoring system 150 and/or external computing devices 160.1-160.M). These devices may then compare or otherwise analyze these sets of information to better determine, for example, if a claim is valid, fraudulent, or inaccurate, which is further discussed below with reference to FIG. 4.

UAV 200 may collect information that is used to determine other types of insurance fraud. For example, an insurer may deploy UAV 200 to a location associated with a person having an open workers compensation claim. UAV 200 may covertly collect images, video, and/or perform any suitable type of surveillance at the specified location. UAV 200 may store this information (e.g., in memory 216) and/or transmit this information back to another device (e.g., central monitoring system 150 and/or external computing devices 160.1-160.M). An insurer may then utilize this information to determine the presence of fraudulent activity.

An insurer or other party may utilize UAV 200 to collect information for claims made that may present an unacceptable risk to investigate in person. For example, UAV 200 may collect information at a site suspected of arson, a site where an explosion has occurred, etc. UAV 200 may collect information (e.g., via sensor array 204) and attempt to identify a source of the claimed damage. Additionally or alternatively, UAV 200 may store this information and/or transmit this information back to computing devices 106 and/or central monitoring system 108 for further analysis, whereupon computing devices 106 and/or central monitoring system 108 may attempt to identify a source of the claimed damage.

D. Supplementing Communications

In some aspects, UAV 200 may be deployed to facilitate various types of communications, which may be in response to an occurrence of a catastrophe. For example, UAV 200 may communicate with secondary, alternative, and/or backup communication networks to provide supplemental cellular and/or other wireless coverage to an area affected by a catastrophic condition. This may include, for example, UAV 200 routing communications between satellites or other access points when a primary cell tower is no longer functional. To provide another example, UAV 200 may receive one or more commands from another device, such as mobile computing device 190, central monitoring system 150, and/or external computing devices 160.1-160.M, for example, that are indicative of cellular communications not functioning within an area. In response to these commands, UAV 200 may act as a wireless access point (AP), providing Internet access and/or cellular communications to devices within its range via an appropriate communications protocol, such as cellular communication protocols, for example.

In one aspect, UAV 200 may supplement communications. For example, UAV 200 may send and/or relay messages notifying other persons of an emergency and/or requesting assistance from emergency response personnel, for example. The messages and/or notifications may be in any suitable form to facilitate the notification of these persons, such as wireless communications, smoke signaling, flares, audible alerts and/or alarms, visual displays of messages, etc. In some aspects, the communications facilitated by UAV 200 may be sent to the appropriate persons via one or more third parties and/or third party services. For example, upon detecting a vehicle collision, UAV 200 may notify a roadside assistance representative (e.g., OnStar) of the vehicle collision, the location of the vehicle collision, etc. To provide another example, UAV 200 may be deployed to a location (e.g., a beacon location) and send one or more emergency messages and/or notifications upon arrival at the location. In this way, UAV 200 may provide en route status updates upon deployment to a location.

To provide another example, UAV 200 may facilitate communications between a dispatcher while an ambulance is being dispatched to the scene of a detected vehicle collision or crash. UAV 200 may be configured to transmit information collected at the scene of the vehicle collision or crash to the ambulance directly and/or via the dispatcher, such that emergency response personnel are better informed of the details of the vehicle collision or crash once they arrive. UAV 200 may track the location of the ambulance and/or receive information regarding the ambulance location. UAV 200 may use tracking information to send information to the ambulance. For example, UAV 200 may transmit information to the ambulance when the distance between the vehicle (or the UAV) and the ambulance is less than a threshold distance. In this way, UAV 200 may ensure that the ambulance is provided with the most recent information prior to arriving at the vehicle collision or crash scene.

To provide yet another example, UAV 200 may provide disaster assistance by providing temporary networking and/or wireless communication, such as providing local 3G/4G functionality and/or reception when primary cellular towers are inoperative. UAV 200 may utilize communication unit 208 to facilitate this functionality, for example, via meshed communications with other UAVs, via satellite communications, etc.

III. Exemplary Mobile Computing Device

Figure 3:
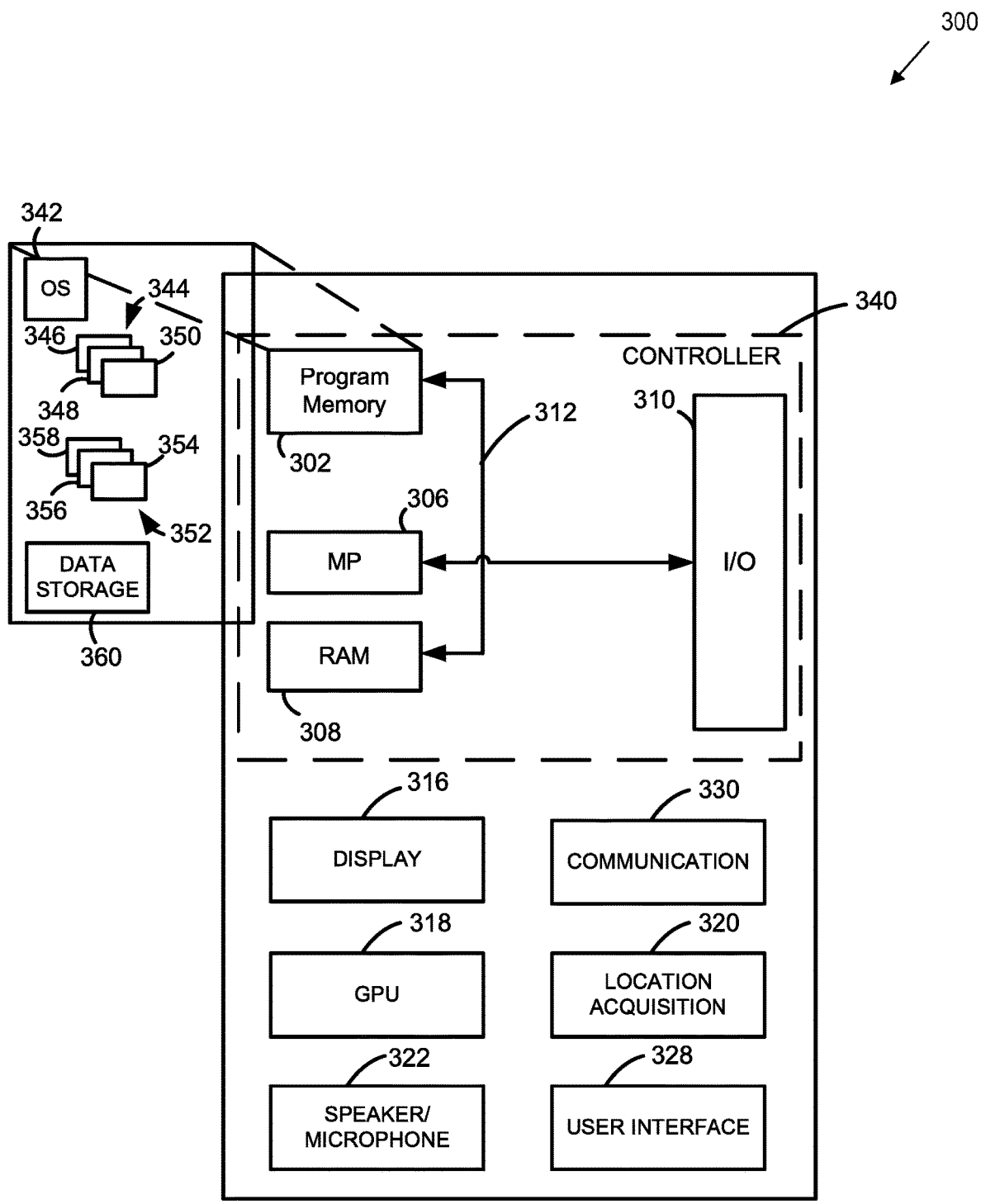
FIG. 3 illustrates an exemplary block diagram of a mobile computing device 300.

FIG. 3 illustrates an exemplary block diagram of a mobile computing device 300. Mobile computing device 300 may be implemented as any suitable computing device. In one aspect, mobile computing device 300 may be an implementation of mobile computing device 190, as shown in FIG. 1.

In one aspect, mobile computing device 300 may be associated with or otherwise utilized by a person whose property was damages by the occurrence of a catastrophe, such as a homeowner, for example. The person may use mobile computing device 300, for example, to report damage, to submit a claim, and/or to request data collection via a UAV.

In another aspect, mobile computing device 300 may be associated with or otherwise utilized by another third party, such as emergency response personnel, for example. The third party may utilize mobile computing device 300, for example, to communicate with a UAV, to receive data collected from a UAV, to control a UAV, and/or to command a UAV to perform various acts.

Mobile computing device 300 may include a controller 340, a display 316, a graphics processing unit (GPU) 318, a location acquisition unit 320, a speaker/microphone 322, a user interface 328, and a communication unit 330. Mobile computing device 300 may include additional, fewer, or alternate components, including those discussed elsewhere herein.

Controller 340 may include a program memory 302, a microprocessor (MP) 306, a random-access memory (RAM) 308, and an input/output (I/O) interface 310, each of which may be interconnected via an address/data bus 312. Controller 340 may be implemented with any suitable type and/or number of processors, such as a host processor of mobile computing device 300, for example. In some aspects, controller 340 may be configured to communicate with additional data storage mechanisms not shown in FIG. 3 for purposes of brevity (e.g., one or more hard disk drives, optical storage drives, solid state storage devices, etc.) that may reside within and/or are otherwise associated with mobile computing device 300.

Program memory 302 may store data used in conjunction with one or more functions performed by mobile computing device 300 to facilitate the interaction between mobile computing device 300 and one or more other devices (e.g., one or more of central monitoring system 150, one or more of UAVs 102.1-102.N, and/or one or more of external computing devices 160.1-160.M). For example, program memory 302 may store one or more programs, applications, algorithms, etc. that, when executed by controller 340, facilitate the interaction between mobile computing device 300 and one or more networks (e.g., communication network 170).

In various aspects, program memory 302 may be implemented as a non-transitory tangible computer readable media configured to store computer-readable instructions that, when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs 306 may be configured to execute one or more of software applications 344, software routines 352 residing in program memory 302, and/or other suitable software applications. Operating system 342 may be implemented as any suitable operating system platform depending upon the particular implementation of mobile computing device 300. For example, operating system 342 may be implemented as a mobile OS platform such as the iOS®, Android™, Palm® webOS, Windows® Mobile/Phone, Black Berry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one aspect, data storage 360 may store data such as application data for the one or more software applications 344, routine data for the one or more software routines 352, user logon credentials, received insurance-related information, received insurance policy data, etc.

Display 316 may be implemented as any suitable type of display and may facilitate user interaction with mobile computing device 300 in conjunction with user interface 328. For example, display 316 may be implemented as a capacitive touch screen display, a resistive touch screen display, etc. In various aspects, display 316 may be configured to work in conjunction with controller 340 and/or GPU 318 to display one or more fields for user input, to display insurance pricing such as premium quotes, to display various details associated with a user's insurance policy such as information associated with the user's insurance profile, the status of a claim, etc.

Location acquisition unit 320 may be configured to generate geographic location data utilizing any suitable global positioning techniques. For example, location acquisition unit 320 may communicate with one or more satellites and/or wireless transmitters to determine a location of mobile computing device 300. Location acquisition unit 320 may function independently or in conjunction with one or more components of mobile computing device 300. For example, location acquisition unit 320 may work in conjunction with communication unit 330 to utilize cellular location data received via communications unit 330 and implement "Assisted Global Positioning System" (A-GPS). To provide additional examples, location acquisition unit 318 may work as an independent unit implementing satellite GPS, or any other suitable global positioning protocol (e.g., the GLONASS system operated by the Russian government, the Galileo system operated by the European Union, etc.) to determine a geographic location of mobile computing device 300.

Communication unit 330 may be configured to facilitate communications between mobile computing device 300 and one or more other devices, such as central monitoring system 150, one or more of UAVs 102.1-102.N, one or more of external computing devices 160.1-160.M, etc. In various aspects, mobile computing device 300 may be configured to communicate with these other devices in accordance with any suitable number and/or type of communication protocols. Thus, in various aspects, communication unit 330 may be implemented with suitable hardware, firmware, and/or software to support any suitable number and type of communication protocols in accordance with the various aspects described herein.

Communication unit 330 may be configured to support separate or concurrent communications, which may be the same type of communication protocol or different types of communication protocols. For example, communication unit 330 may be configured to facilitate communications between mobile computing device 300 and one or more backend components (e.g., one or more of central monitoring system 150 and/or external computing devices 160.1-160.M) via a cellular communications protocol while facilitating communications between mobile computing device 300 and one or more UAVs 102.1-102.N via a personal area network communications protocol, a Wi-Fi protocol (e.g., Wi-Fi direct), etc.

Speaker/microphone 322 may be configured as one or more devices. For example, speaker/microphone 322 may include a microphone configured to detect sounds and to convert detected sounds to digital data suitable for storage in data storage 360 or another suitable local or external location. Speaker/microphone 322 may additionally or alternatively include a speaker configured to play sounds, instructions, etc., in response to data received from one or more components of mobile computing device 300 (e.g., controller 340 and/or communication unit 330).

User interface 328 may be implemented as any suitable device configured to collect user input, such as a "soft" keyboard displayed on display 316, a keyboard attached to mobile computing device 300, an external keyboard communicating via a wired or a wireless connection (e.g., a BLUETOOTH keyboard), an external mouse, etc.

In one aspect, software applications 344 may include an insurance claim application 346, which may be implemented as a series of machine-readable instructions for executing one or more functions described herein. In another aspect, insurance claim application 346 may cooperate with one or more other hardware or software components of mobile computing device 300 to perform these functions.

For example, insurance claim application 346 may include various instructions for facilitating reporting or otherwise communicating information to an insurer, which may be used by the insurer for various insurance-related purposes and are further discussed below with reference to FIG. 4. In one aspect, when launching insurance claim application 346, a user may enter logon credentials which may be verified by one or more external computing devices, servers, etc. (e.g., one or more of external computing devices 160.1-160.M). These logon credentials may be associated with insurer profile data, such as insurance policy numbers, property insured, vehicle identification numbers of insured vehicles, addresses of insured structures, contact information, premium rates, discounts, etc. In this way, communications from mobile computing device 300 allow central monitoring system 150 and/or one or more of external computing devices 160.1-160.M to uniquely identify the insured customer so that any data collected, such as data collected via mobile computing device 300 and/or via one or more UAVs 102.1-102.N, may be saved and later referenced to the insurance customer and/or any insurance policies associated with that customer.

For example, insurance claim application 346 may facilitate the determination of a geographic location of mobile computing device 300 (e.g., via communications with location acquisition unit 320) and communicate this information to one or more of central monitoring system 150, one or more of UAVs 102.1-102.N, and/or one or more of external computing devices 160.1-160.M. To provide additional examples, insurance claim application 346 may facilitate instructions and/or prompts being displayed via display 316 guiding a user to collect data associated with damage caused to insured property due to the occurrence of a catastrophe (e.g., post-catastrophe images of property, aerial images of an insured structure, etc.).

To provide an additional example, insurance claim application 346 may facilitate a user requesting one or more UAVs 102.1-102.N to a location to request UAV data collection with respect to property that has been damaged by an insured event (e.g. catastrophe (hurricane) or non-catastrophe (house fire)). A user may request such data collection, for example, when reporting an insurance claim for the damaged property. In accordance with such aspects, the requested location may be specified, for example, by the geographic location of mobile computing device 300, which may be determined by location acquisition component 320 and transmitted via communication unit 330.

Mobile computing device 300 may send such requests, for example, to one or more of central monitoring system 150, external computing devices 160.1-160.M, and/or to one or more UAVs 102.1-102.N. One or more of central monitoring system 150 and/or one or more of external computing devices 160.1-160.M may process these requests manually, automatically, or semi-automatically to dispatch one or more UAVs 102.1-102.N to the requested scene of the vehicle collision.

In one aspect, software applications 344 may include an emergency response application 348, which may be implemented as a series of machine-readable instructions for executing one or more functions described herein. In another aspect, emergency response application 348 may cooperate with one or more other hardware or software components of mobile computing device 300 to perform these functions.

In one aspect, emergency response application 348 may facilitate UAV emergency assistance due to a catastrophe that has occurred, is already occurring, or is about to occur. For example, if a person is trapped beneath a building or structure due to an earthquake but has access to mobile computing device 300, the person may utilize emergency response application 348 to request UAV assistance. Upon sending the request, mobile computing device 300 may include the geographic location of the person in need of assistance (e.g., GPS coordinates of mobile computing device 300). Upon arriving at the location corresponding to the GPS coordinates, UAV 200 may utilize various sensors (e.g., IR sensors, heat sensors, ground penetrating RADAR, etc.), for example, to locate the trapped person. These aspects may be particularly useful in dense urban areas where the emergency response time is high and/or when a severe catastrophe results in a high demand of emergency assistance, as UAVs may arrive at a requested location faster than emergency response personnel.

To provide another example, emergency response application 348 may facilitate emergency response personnel arriving at the scene where assistance is needed. As previously discussed, UAV 200 may communicate with emergency response personnel via their respective mobile computing devices to provide information regarding injuries, property damage, etc., at the scene where a catastrophe has occurred, is occurring, or is about to occur. In accordance with such aspects, emergency response personnel may utilize mobile computing device 300 in conjunction with emergency response application 348, which may facilitate communications with one or more UAVs, allow commands and/or other instructions to be sent to one or more UAVs, receive collected data from one or more UAVs, report the geographic location of mobile computing device 300, format and display data collected by one or more UAVs, etc.

Software applications 344 may include a web browser 350. In some aspects, web browser 350 may be a native web browser application, such as Apple's Safari®, Google Android™ mobile web browser, Microsoft Internet Explorer® for Mobile, Opera Mobile™, etc. In other embodiments, web browser 350 may be implemented as an embedded web browser. Regardless of the implementation of web browser 350, various aspects include web browser 350 being implemented as a series of machine-readable instructions for interpreting and displaying web page information received from one or more backend components. This web page information may be utilized in conjunction with insurance claim application 346 and/or emergency response application 348 to perform one or more function of the aspects as described herein.

In one embodiment, software routines 352 may include a data collection routine 354, a UAV request routine 356, and/or a feedback routine 358. Data collection routine 354 may include instructions, that when executed by controller 340, facilitate the collection of audio, video, and/or image data associated with one or more locations, which may include property that has been damaged by a catastrophe, for example.

For example, data collection routine 354 may include instructions that, when executed by controller 340 in conjunction with insurance claim application 346, present a user with instructions and/or prompts to collect images, video, answer one or more predetermined interview questions prepared by an insurer, collect insurance claim form field data entered by a user, etc. In one aspect, data collection routine 354 may include instructions that, when executed by controller 340 in conjunction with insurance claim application 346, store the collected data as one or more data files in data storage 360 and/or cause the collected data to be transmitted via communication unit 330 to one or more external computing devices 160.1-160.M. External computing devices 160.1-160.M may use this data in addition to or as an alternative to the collected drone data to perform various insurance-related tasks, which are further discussed below with reference to FIG. 4.

UAV request routine 356 may include instructions, that when executed by controller 340, facilitate the dispatching of one or more UAVs 102.1-102.N to a location specified by a user, which may be, for example the scene of a catastrophe. In one aspect, UAV request routine 356 may include instructions that, when executed by controller 340 in conjunction with insurance claim application 346, display one or more options to a user to request one or more UAVs 102.1-102.N, to determine and/or transmit the requested UAV delivery location, and/or to transmit the request via communication unit 330.

Feedback routine 358 may include instructions, that when executed by controller 340, support user interaction with mobile computing device 300. For example, controller 340 may execute instructions stored in feedback routine 358 to obtain information from a user and/or to provide the user with information received from one or more of UAVs 102.1-102.N, central monitoring system 150, and/or one or more of external computing devices 160.1-160.M, such as an estimated time of arrival for one or more requested UAVs 102.1-102N, for example.

To provide another example, controller 340 may execute instructions stored in feedback routine 358 to display one or more prompts, to view insurance-related data such as insurer profile data, to view updates and/or the status of pending claims, to view updated insurance-related data such as calculated insurance premiums, to view the status of an insurance claim, the impact of a claim on a user's insurance policy data, etc.

Although each of the components in FIG. 3 are illustrated as separate units or modules, any components integrated as part of mobile computing device 300 may be combined and/or share functions. For example, controller 340, GPU 318, and program memory 302 may be integrated as a single processing unit. Furthermore, although connections are not shown between the individual components of mobile computing device 300, mobile computing device 300 may implement any suitable number of wired and/or wireless links to facilitate communication and interoperability between these components.

For example, program memory 302, communication unit 330, and/or display 316 may be coupled via wired buses and/or wireless links to controller 340 and/or GPU 318 to facilitate communications between these components and/or to enable these components to accomplish their respective functions as described throughout the present disclosure. Furthermore, although FIG. 3 illustrates mobile computing device 300 having a single program memory 302, mobile computing device 300 may implement any suitable number and/or combination of memory systems.

Additionally, although FIG. 3 depicts controller 340 as including one program memory 302, one MP 306, and one RAM 308, controller 340 may include any suitable number of these components. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

IV. Exemplary External Computing Device

Figure 4:
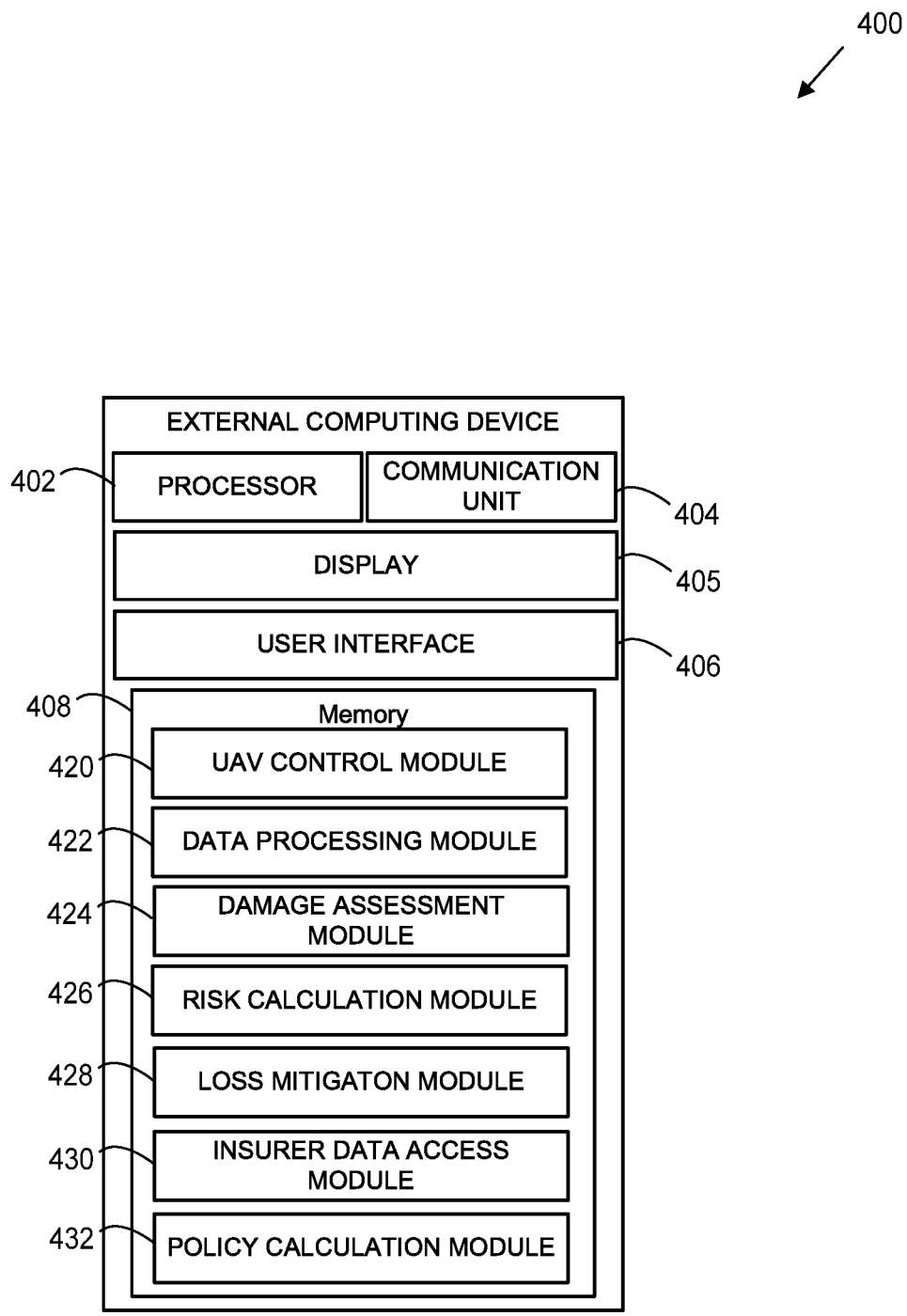
FIG. 4 illustrates an exemplary block diagram of an external computing device 400.

FIG. 4 illustrates an exemplary block diagram of an external computing device 400. External computing device 400 may be implemented as any suitable computing device. In various aspects, external computing device 400 may be an implementation of central monitoring system 150 or one or more of external computing devices 160.1-160.M, as shown in FIG. 1. External computing device 400 may include a processor 402, a communication unit 404, a display 405, a user interface 406, and a memory 408. External computing device 400 may include additional, fewer, or alternate components, including those discussed elsewhere herein.

Processor 402 may be implemented as any suitable type and/or number of processors, such as a host processor of external computing device 400, for example. To provide additional examples, processor 402 may be implemented as an application specific integrated circuit (ASIC), an embedded processor, a central processing unit (CPU) associated with external computing device 400, a graphical processing unit (GPU), etc.

Processor 402 may be configured to communicate with one or more of communication unit 404, display 405, user interface 406, and/or memory 408 via one or more wired and/or wireless interconnections, such as any suitable number of data and/or address buses, for example. These interconnections are not shown in FIG. 4 for purposes of brevity.

Processor 402 may be configured to operate in conjunction with one or more of communication unit 404, display 405, user interface 406, and/or memory 408 to process and/or analyze data, to store data to memory 408, to retrieve data from memory 408, and/or to perform one or more insurance-related functions. For example, processor 402 and communication unit 404 may facilitate receiving data from and/or sending data to one or more devices, such as central monitoring system 150, mobile computing device 200, one or more UAVs 102.1-102.N, etc.

Communication unit 404 may be configured to facilitate communications between external computing device 400 and one or more other devices. For example, in aspects in which external computing device 400 is an implementation of one or more of external computing devices 160.1-160.M, as shown in FIG. 1, communication unit 404 may facilitate communications between external computing device 400 and one or more UAVs 102.1-102.N, mobile computing device 300, and/or central monitoring system 150.

In various aspects, external computing device 400 may be configured to communicate with these other devices in accordance with any suitable number and type of communication protocols. Thus, in various aspects, communication unit 404 may be implemented with suitable hardware, firmware, and/or software to support any suitable number and type of communication protocols in accordance with the various aspects described herein.

Display 405 may be implemented as any suitable type of display and may facilitate user interaction with external computing device 400 in conjunction with user interface 406. For example, display 405 may be implemented as a capacitive touch screen display, a resistive touch screen display, etc. In various aspects, display 405 may be configured to work in conjunction with processor 402 and/or user interface 406 to display collected drone data received from one or more UAVs, to display data received from one or more mobile computing devices (e.g., requests for UAVs to be sent to a particular location), to display the result of various insurance-related calculations, to display the location of one or more UAV's, to display insurance profile data and/or other information associated with an insurance policy and or an insured customer, to provide a graphical user interface (GUI) to facilitate the control and/or monitoring of one or more UAVs, etc.

User-interface 406 may be implemented as any suitable device configured to collect user input, such as a "soft" keyboard displayed on display 405, a keyboard attached to external computing device 400, an external keyboard communicating via a wired or a wireless connection (e.g., a BLUETOOTH keyboard), specialized joystick controls configured to control one or more UAVs, an external mouse, etc.

In various aspects, memory 408 may be implemented as a non-transitory tangible computer readable media configured to store computer-readable instructions, that when executed by processor 402, cause processor 402 to perform various acts. Program memory 408 may store one or more modules, which may be executed by processor 402 in conjunction with one or more other hardware or software components of external computing device 400 to facilitate the execution of one or more functions related to the various aspects, examples of which are further discussed below.

UAV control module 420 may include instructions to facilitate monitoring and/or controlling of one or more UAVs, such as UAVs 102.1-102.N, for example, as shown in FIG. 1. UAV control module may include instructions that, when executed by processor 402, enables processor 402 to process data sent by one or more UAVs, to identify one or more UAVs, to determine a status of one or more UAVs, and/or to transmit commands to one or more UAVs.

For example, processor 402 may receive periodic transmissions sent by one or more UAVs, which may include a unique UAV identifier, a current geographic location of each UAV, a UAV status (e.g., en route to location, collecting data, charging and/or refueling, etc.), and/or a confirmation of receipt of a command sent to one or more UAVs. In some aspects, processor 402 may use this information to command one or more UAVs to navigate to a specific geographic location or to return to a predetermined "base" location, which may be used for refueling, recharging, and/or maintenance, for example.

In some aspects, a user may interact with external computing device 400 to perform control over one or more UAVs by, for example, watching video data and/or geographic location data received from one or more UAVs shown on display 405 and sending commands to one or more UAVs using this feedback. Information shown on display 405 for UAV control may include, for example, live video data, a map overlaid onto the UAV's current geographic location, etc.

In accordance with such aspects, processor 402 may execute instructions stored in UAV control module 420 to process controls received via user interface 406 (e.g., adjustments to altitude, speed, yaw, pitch, roll, direction, etc.), and convert these controls to data that is sent in a UAV control transmission, which may be transmitted via communication unit 404, for example.

When controlled by a user, external computing device 400 may function as a UAV dispatching center, receiving instructions to dispatch one or more UAVs and then navigating the one or more UAVs to the requested geographic locations, which may include the location of where a catastrophe is about to occur, has already occurred, or is presently occurring. For example, personnel trained to control UAVs may monitor communications received via communication unit 404, which may be forwarded from a call center (e.g., from a person requiring assistance), received as a request sent via a mobile computing device, etc.

In other aspects, one or more UAVs may be controlled without (or with minimal) user intervention. In accordance with such aspects, external computing device 400 may function as a UAV dispatching center, but a person may not need to manually control one or more UAVs. For example, UAV requests may be received by external computing device 400 in an automated fashion, such as requests sent via a mobile computing device or via another Internet-enabled device, for example. In accordance with such aspects, these requests may include the geographic location of a requested UAV destination and/or details regarding the type of data to be collected upon the UAV reaching the destination.

In accordance with such aspects, processor 402 may execute instructions stored in UAV control module 420 to process these requests, determine a navigation route for one or more UAVs, and transmit the appropriate commands to one or more UAVs to ensure the UAV arrives at the requested geographic location. In various aspects, processor 402 may utilize live video data received from a UAV, weather conditions, and/or any other suitable data to safely guide the UAV to the requested location.

For example, processor 402 may execute instructions stored in UAV control module 420 analyze live video data received from a UAV in accordance with any suitable image recognition, object recognition, and/or machine vision algorithms to guide the UAV to a specific geographic location with little or no user intervention.

In some aspects, a UAV may be dispatched after a catastrophe (e.g., a traffic collision) has occurred to assist injured persons and/or to collect data related to damage caused by the catastrophe. But in other aspects, one or more UAVs may actively survey an area to collect data prior to the occurrence of the catastrophe, and save and/or transmit this data as needed. These aspects may be particularly useful to obtain pre-catastrophe images and/or video of structures or other property, which may be compared to post-catastrophe images to assess damage. The one or more UAVs may store collected drone data in a rolling buffer, periodically transmit collected drone data to external computing device 400, etc.

Regardless of how external computing device 400 controls one or more UAVs, aspects include processor 402 executing instructions stored in UAV control module 420 to send one or more commands to one or more UAVs which, upon receiving by the commands, execute them to collect various types of data and/or to execute one or more functions. For example, processor 402 may execute instructions stored in UAV 402 to send data in a UAV data transmission, which may be transmitted via communication unit 404, for example. This data may indicate specific commands which may be manually sent by a user and/or automatically sent upon a particular condition being satisfied, for example (e.g., the UAV arriving within a threshold distance of a destination).

The data collection commands may include any suitable command for the collection of drone data or the execution of a particular function, such as recording audio, images, and/or video, providing assistance, issuing warnings, extracting soil for testing, a command for a UAV to take various images (at different angles and distances) of a structure before and/or after damage caused by a catastrophe, etc.

Data processing module 422 may include instructions to facilitate the collection of drone data from one or more UAVs, such as UAVs 102.1-102.N, for example, as shown in FIG. 1. Additionally or alternatively, data processing module 422 may include instructions to facilitate the collection of other sources of data, such as data received via one or more mobile computing devices and/or from emergency response personnel, for example.

Data processing module 422 may include instructions that, when executed by processor 402, enable processor 402 to process drone data sent by one or more UAVs, to store the drone data in memory 408 and/or another suitable storage device (e.g., one or more databases in which external computing device 400 is connected), and/or to transmit the drone data to one or more other external computing devices.

For example, once a UAV arrives at a particular location, the UAV may proceed to collect drone data, as previously discussed above with reference to execution of the instructions stored in UAV control module 420, which may include images and/or video, for example. These images and/or video data may provide, for example, images identifying damage caused by a catastrophe.

In various aspects, processor 402 may execute instructions stored in data processing module 422 to receive collected drone data from the one or more UAVs, to parse the data, and/or to correlate the data so that specific drone data may be later identified and associated with the particular type of data and/or the geographic location, particular home, address, etc., to which the data corresponds.

To provide an illustrative example, processor 402 may execute instructions stored in data processing module 422 to process live images, video, and/or audio data recorded by a UAV, which may include various types of information used to assess the damage caused by a catastrophe. In one aspect, this video may be time-stamped by the UAV and/or by external computing device 400 to indicate when each command was sent and/or when each different type of data was recorded.

In this way, external computing device 400 may receive the data, parse the data, reference the timestamps to the commands sent, and label and/or store the parsed collected drone data in a way such that it may be identified. For example, drone data may include several images of the scene where a catastrophe occurred. Aspects include processor 402 executing instructions stored in data processing module 422 to separate these videos and store them with a suitable header, filename, label, etc., so that this data can be easily identified, accessed, read, viewed, processed, etc.

To provide another example, drone data may include the results of a soil moisture analysis. Aspects include processor 402 executing instructions stored in data processing module 422 to reference the geographic location data generated by the UAV's sensors to identify the structure and location on the property of the structure associated with the results of the soil moisture data.

Additionally or alternatively, aspects include processor 402 executing instructions stored in data processing module 422 to determine an elevation from which the aerial images were taken above a structure to assess roof damage, which may be identified, for example, via elevation data included as part of the geographic coordinates generated by the UAV and transmitted as part of the collected drone data. The elevation data may also be calculated via an analysis of other sensor metrics measured by the UAV and included in the collected drone data, such as changes in barometric pressure between the ground level and the elevation from which the aerial images were captured, for example.

Damage assessment module 424 may include instructions to facilitate the determination of the extent of damage, an estimated monetary value of damage caused by a catastrophe, and/or the severity of the catastrophe itself. In various aspects, processor 402 may assess damage utilizing the collected drone data and/or the data stored as a result of processor 402 executing instructions stored in data processing module 422, as previously discussed.

For example, external computing device 400 may receive, as part of the collected drone data, pre-catastrophe and post-catastrophe images of a structure or other property damages by the catastrophe. In one aspect, processor 402 may execute instructions stored in damage assessment module 424 to compare the images manually, semi-automatically, or automatically to determine a monetary estimate of damage caused by the catastrophe. External computing device 400 may implement any suitable image recognition techniques to identify differences between the pre-catastrophe and post-catastrophe images and/or to determine or quantify the extent of damage, the number of structures impacted, the level of damage, etc. Regarding the level of damage, aspects include the use of any suitable scale such as, for example, a scaled indication that the damage is slight, moderate, severe, a dwelling may be habitable or uninhabitable, etc.

In manual aspects, the image comparison may be performed, for example, by insurer personnel trained to identify the type of damage caused, contact one or more third parties to obtain an estimated repair, consult tables, databases, etc.

In automated or semi-automated aspects, processor 402 may execute instructions stored in damage assessment module 424 to analyze each image to identify the differences between them. This comparison may be performed, for example, using any suitable object recognition techniques or other suitable photogrammetric techniques such that the damage may be adequately identified and measured. Damage assessment module 424 may include instructions to facilitate different types of image comparisons based upon the type of property that is damaged.

For example, when comparing images of a structure, damage assessment module 424 may facilitate the identification of structural damage, damage to siding, damage to windows, etc. To identify this damage, damage assessment module 424 may perform a suitable object-recognition techniques applicable to this type of damage. But when the damage is to a vehicle, damage assessment module 424 may facilitate the identification of frame damage, damage to the exterior of the vehicle, whether an airbag was deployed, whether glass was broken, etc.

In one aspect, processor 402 may execute instructions stored in assessment module 424 to measure, utilizing a photogrammetric analysis of post-catastrophe images, the size of one or more points where damage has occurred, a structural crush depth associated with any points of impact (e.g., from falling trees), etc. In one aspect, processor 402 may use known reference lengths within the image to perform these calculations.

The adjustment of the object recognition technique may be accomplished, for example, by utilizing different training classifiers based upon the type of insurance claim that is submitted to the insurer and/or the type of property that is being assessed for damage. In this way, damage assessment module 424 may facilitate external computing device 400 identifying damage associated with a catastrophe, assessing the monetary value of that damage, and/or determining or quantifying the extent of damage, the number of structures impacted, the level of damage, etc., with little or no user intervention.

Additionally or alternatively, the identification of damage and/or the assessment of monetary damage may be further assisted by applying one or more profiles to the analysis of the images based upon the categorization of the catastrophe. For example, when the type of catastrophe is known for a submitted insurance claim, processor 402 may execute instructions in assessment module 424 to analyze one or more images in accordance with the specific type of catastrophe. In other words, different types of catastrophes are associated with different types of damage to property. Assessment module 424 may include instructions such that, when the catastrophe is known, processor 402 may compare the images to look for a specific type of damage known to be associated with that catastrophe.

To provide an illustrative example, if a heavy storm occurred and included heavy rainfall, processor 402 may execute instructions stored in assessment module 424 to compare the images taken of a structure before the storm and after the storm with specific classifier values, lighting analysis, etc., to specifically identify flood damage to the structure. Aspects include processor 402 iteratively repeating this process for a single catastrophe to identify the various types of expected damage for a specific type of catastrophe. In this way, external computing device 400 may improve upon the accuracy of traditional damage assessment techniques by predicting the type of damage most likely to occur and analyzing the images by taking this into consideration.

In various aspects, when processor 402 performs image comparison between pre-catastrophe and post-catastrophe images, the results of this comparison may be quantified in any suitable manner based upon the utilized algorithm. The quantified difference may include, for example, a percentage difference in coloration, pixel mismatches, lighting differences, a number of artifacts included in one image but not the other, etc. For example, an insurer may compare these quantified differences to a threshold value to decide whether a claim should be opened, whether the damage needs to be assessed, or which insurance department a submitted claim should be routed.

Risk calculation module 426 may include instructions to facilitate the determination of a present risk of damage to property that may be caused in the event of a catastrophe and/or the present risk of a catastrophe occurring due to one or more factors. In various aspects, processor 402 may assess this level of risk utilizing the collected drone data and/or the data stored as a result of processor 402 executing instructions stored in data processing module 422, as previously discussed.

In various aspects, processor 402 may execute instructions stored in risk calculation module 426 to analyze images, video, and/or other data associated with an insured property such as a home, for example. For example, images and/or video may reveal factors that may lead to an increased risk of fire, structural damage, flood, etc., in the event that a future catastrophe occurs. To provide another example, the collected drone data may include infrared and/or thermal imaging data that reveals nearby areas associated with a fire and the proximity of property to the fire, thereby allocating a higher risk level to property at risk of damage due to future fires.

To provide an illustrative example, prior to renewal of a homeowners insurance policy (e.g., some threshold period of time before expiration, upon a renewal ordinarily being sent to the customer, etc.) a UAV may be dispatched to the location of an insured home to collect a soil sample. The UAV may locally analyze the soil sample for moisture content, offload this processing to external computing device 400, and/or deliver the soil sample for further testing to an appropriate test facility. Once the soil moisture content is known, it may be used in conjunction with one or more other factors to facilitate the determination of a risk of the property flooding and/or a risk of sewer and drain backup via a manual review process, by external computing device 400 accessing data such as property topography and building characteristics, etc. This risk level may be scored or otherwise quantified and associated with the insurer's profile.

To provide another example, processor 402 may analyze one or more images collected by a UAV to calculate a distance between vegetation, trees, shrubs, etc., outside the structure and the outside of the structure. Once this distance is known, a risk of wildfire caused by the proximity of these materials to the structure may be determined by manual review, calculated by external computing device 400 accessing data such as statistical weather variations, average humidity, information indicative of wildfires caused in a similar manner nearby, etc.

To provide yet another example, processor 402 may analyze one or more images collected by a UAV to calculate a scaled rating of a building's hazard resistance, and/or hazard resistance integrity to mitigate earthquake risk based upon the scaled rating of the building's characteristics. This scaled rating may be calculated, for example, based upon ratings, weights, attributes, etc., assigned to the building's characteristics. Also, this scaled rating may be calculated in any suitable manner based upon any suitable number and type of factors related a building's characteristics, inherent qualities of the building, and/or assumptions based upon the known or identified structure of the building. For example, an irregular floor plan, soft story, and/or masonry veneer affect the resilience of a building facing seismically generated forces. Once this scaled rating is known, a risk of structural damage to the building (e.g., from an earthquake) may be determined by manual review, calculated by external computing device 400 accessing data such as the frequency of earthquakes or other events likely to cause structural damage in the area, information indicative of high water or sand content in the nearby soil, etc. In respect, the scaled rating may also be viewed as a structural integrity resilience rating or ranking.

To provide a further example, processor 402 may analyze one or more images collected by a UAV while a catastrophe is occurring to analyze the risk of harm to one or more persons. The risk to each person may be calculated, for example, based upon the type of catastrophe, the condition of one or more persons, the proximity of the one or more persons to a specific type of danger caused by the catastrophe, the mobility of one or more persons, whether one or more persons is unconscious or in shock, etc. Processor 402 may rank or assign a risk rating to each person based upon each person's risk level. Once the risk level of each person is known, external computing device 400 may direct or control one or more UAVs (of UAV 200 may make this determination itself) to first assist (e.g., via delivery of supplies, communicating with a person, etc.) those persons determined to be at the most risk or in the most danger of a risk.

Loss mitigation module 428 may include instructions to facilitate the mitigation of damage to property in the event of a catastrophe. In various aspects, processor 402 may execute instructions stored in loss mitigation module 428 to generate notifications, communicate with an insurance customer, and/or perform one or more actions to facilitate loss mitigation, which may utilize collected drone data or data from other sources.

For example, as discussed above, processor 402 may execute instructions stored in risk calculation module 426 to determine the present risk of damage to property in the event of a catastrophe, or the risk that present conditions may trigger such a catastrophe. Using this information, aspects include processor 402 executing instructions stored in loss mitigation module 428 to perform various actions when the risk level is above a certain threshold, the risk level translates to a particular monetary sum above some threshold payout value, etc.

To provide an illustrative example, external computing device 400 may analyze data collected by one or more UAVs to determine a soil moisture content, for example, after a heavy rainfall. This moisture content should preferably be in some range of acceptable values based upon the amount of rainfall. The moisture content may provide an indication of how many sump pumps are needed and a sump pump of a minimum rating. Therefore, aspects include external computing device 400 sending a notification recommending a minimum number of sump pumps, recommending that the homeowner have a sump pump of a particular power rating, recommending that the homeowner have a backup sump pump, etc., based upon the soil moisture data.

To provide another illustrative example, external computing device 400 may send a notification instructing a homeowner to trim and/or remove vegetation outside the home when the minimum distance between the vegetation and the home is calculated as less than some threshold distance.

To provide yet another illustrative example, external computing device 400 may send a notification instructing a homeowner to tend to repairs when certain structural defects are observed, such as a front porch sagging to create a height difference between two different sides that is in excess of some threshold distance, indicating that column foundations have settled and/or post bases have been damaged and/or are rotting.

Regardless of the event used to trigger the notification or the contents of the notification, external computing device 400 may send the notification in any suitable manner, such as via mail, email, a push notification or text message to the insured customer's mobile computing device, etc.

Insurer data access module 430 may include instructions to facilitate external computing device 400 accessing, reading, storing, and/or updating insurer data. For example, an insurer may store insurance policy data associated with property and/or persons insured, their policy information, policy numbers, profile data, current premiums, the name of persons insured and their contact information, property insured such as vehicles, homes, boats, etc., license plate numbers or other identifying numbers, registration information, a history of vehicle collisions and/or citations, discounts in which insured customers may be qualified for and/or currently taking advantage of, current open claims, a history of previous claims, etc. This insurance policy data may be stored across several external computing devices, on one or more databases and/or storage devices, etc.

In various aspects, some portions of the insurance data may be secured by the insurer as proprietary information, while other aspects of the insurance data may be made available to authorized users via the Internet (e.g., those providing the correct logion credentials). Processor 402 may execute instructions stored in insurer data access module 430 to allow parties access to insurance data in accordance with the appropriate level of access established by the insurer.

In one aspect, processor 402 may execute instructions stored in insurer data access module 430 to facilitate accessing this data and/or manipulating this data. For example, an insured customer may report damage to her home (e.g., via her mobile computing device) and supply her logon credentials, which may be used by external computing device 400 to access the insurer data for the insured customer in a secure manner.

In one aspect, processor 402 may execute instructions stored in insurer data access module 430 to facilitate receiving, generating, processing, routing, and/or handling a submitted insurance claim. For example, an insured customer may submit a claim via an application running on his respective mobile computing device. External computing device 400 may receive this claim, which may include, for example, details regarding the extent of damage, a request for further inspection by one or more UAVs, the claim amount, an estimate of the damage caused, etc. Processor 402 may utilize estimated damages (e.g., from pre-catastrophe and post-catastrophe image comparison) to determine whether the claim amount is fraudulent and/or inaccurate. For example, processor 402 may execute instructions stored in insurer data access module 430 to compare the estimated monetary damage to the amount submitted in the insurance claim by the customer. If these amounts differ by greater than some error threshold value, then processor 402 may cause the submitted claim to be flagged, further subjected to manual review, etc.

In one aspect, external computing device 400 may generate one or more estimated insurance claims with little or no user intervention using the collected drone data, information submitted from an insurance customer via a mobile computing device, etc. For example, UAVs may identify the geographic location of a home and send this information along with other collected data to external computing device 400. Upon receiving this data (e.g., via communication unit 404) processor 402 may execute instructions stored in insurer data access module 430 to correlate the geographic location where the data was collected to an insurer address, estimate damage (which may be the amount of a total loss, for example) to the insured customer's property at that address, and to open one or more insurance claims using this information. Additionally or alternatively, processor 402 may execute instructions stored in insurer data access module 430 to cause the estimated insurance claim to be presented to the insurance customer for review, approval, or modification (e.g., via a notification sent from communication unit 404).

In one aspect, processor 402 may execute instructions stored in insurer data access module 430 to pay monies associated with one or more of the estimated claims. For example, the monies may be paid to the insured or owner of the insured assets to facilitate providing prompt relief to customers of the insurance provider. This may be facilitated, for example, via communications sent via communication unit 404 to wire the monies to an appropriate bank account, to communicate with one or more automated clearing houses, etc.

In some aspects, the insurer may decide to set aside a reserve amount of money into an insurer account based upon the estimate of damages in anticipation of one or more claims being filed. These aspects may be particularly useful, for example, when a severe catastrophe has occurred and the insurer expects a large number of claims, or claims having a high monetary value associated with them, to be filed. In one aspect, processor 402 may execute instructions stored in insurer data access module 430 to set aside the reserve amount of money when the estimated damage exceeds some monetary threshold value for a single structure or other insured property. This estimate may be provided by the insured customer, calculated from a comparison of pre-catastrophe and post-catastrophe images collected by one or more UAVs, determined from an analysis of images taken by one or more UAVs, etc.

In other aspects, processor 402 may execute instructions stored in insurer data access module 430 to set aside the reserve amount of money. For example, insurers may utilize different types of reserve accounts. One type of reserve account may be associated with a bulk reserve and be based upon an estimate of all the property damaged in an area due to the occurrence of an insured event. That is, if the insurer determines that a similar type of event previously correlated to an average paid claim of $5600 and it is estimated that the catastrophe damaged 1000 structures, the insurer may set aside $5,600,000 for this event.

Another type of reserve account is associated with an estimated loss for an individual claim made by an insurance customer due to damage caused by an insured event. For instance, a serious wind storm may lead to an initial estimate by the insurer of $50,000 in damages. Although this initial estimate may change as more information becomes available to the insurer (e.g. estimates from contractors, bills for material and labor, etc.), the initial $50,000 damage estimate may be initially set aside in a reserve account for the individual claim.

In various aspects, processor 402 may execute instructions stored in insurer data access module 430 to set aside the reserve amount of money into one of the aforementioned types of reserve accounts, for example. The trigger for this may be based upon the estimated damage from an aggregated sum of several insured customers exceeding some number of claims anticipated to be filed or exceeding a threshold monetary value, the estimated damage for a particular insurance claim exceeding a threshold monetary value, etc.

Processor 402 may also execute instructions stored in insurer data access module 430 to identify other types of insurance fraud. For example, external computing device 400 may receive collected data from one or more UAVs. This data may be utilized as surveillance data, for example, to identify acts associated with insurance fraud, such as recording persons engaging in activity after claiming personal injury, for example. If this type of activity is identified, aspects include processor 402 executing instructions stored in insurer data access module 430 to flag the corresponding submitted claim, to further review the details associated with the insurance claim, etc.

To provide another example of fraud detection, one or more UAVs 200 may collect surveillance data that indicates that someone has purposely relocated an insured vehicle to an area known to be commonly damaged in the event of a catastrophe (e.g., an area that commonly floods after a heavy rainfall, an area in the path of a hurricane, etc.). By doing so, an insurance customer may hope to have the insured vehicle intentionally damaged or "totaled" as a result of the catastrophe. In some aspects, the surveillance data may be analyzed, for example, by dispatching one or more UAVs 200 to areas that may be associated with such activities and recording activities that occur at those areas within some window of time associated with the occurrence of a catastrophe. For example, an insurer or other third party may dispatch one or more UAVs 200 to such areas for 24 hours before a catastrophe is expected to occur and keep one or more UAVs 200 at such locations (e.g., working in shifts) until 24 hours after the catastrophe has occurred.

Policy calculation module 432 may include instructions to facilitate external computing device 400 calculating insurance-related pricing related to one or more insurance policies based upon an insurance claim payout, a history of payouts, an estimated damage amount, the insured customer failing to heed a notification instructing the insurance customer to take a certain action to mitigate risk within a certain period of time, etc.

For example, processor 402 may execute instructions stored in policy calculation module 432 to reassess and/or recalculate premiums related to one or more insurance policies based upon a submitted claim and/or the damage paid out for that claim. To provide another example, if an insurance customer was notified to trim vegetation to reduce the risk of fire, processor 402 may execute instructions stored in policy calculation module 432 to decrease (or increase) premiums upon renewal of the homeowner's policy if follow up images collected by one or more UAVs indicate that the homeowner has (or has not) abided by these instructions or recommendations. To provide additional examples, processor 402 may execute instructions stored in policy calculation module 432 to qualify (or disqualify) an insured customer from one or more discounts when the collected UAV images show that a home is at a lowered (or an increased) risk of fire, flooding, etc. As a result, insurance cost savings or discounts may be passed upon to risk averse insurance customers. In one aspect, policy calculation module 432 may include instructions to facilitate the calculation of insurance pricing using any suitable techniques, which may include traditional techniques that utilize the collected drone data.

In one aspect, processor 402 may execute instructions stored in insurer data access module 430 to update the insurance data with an updated insurance pricing. Further in accordance with such aspects, processor 402 may execute instructions stored in policy calculation module 432 to cause external computing device 400 to transmit the updated insurance pricing to a computing device (e.g., to a mobile computing device via communication unit 404).

In one aspect, the mobile computing device, upon receiving the updated insurance pricing data, may display the updated insurance pricing data related to the user's insurance policy. This may include, for example, an indication of updated premium pricing, lost discounts, an indication that pricing, discounts, etc., will remain unchanged as a result of a submitted claim, etc. Again, the notification may be performed using any suitable techniques, such as sending an email, a text message, a push notification, etc., to the insured driver's mobile computing device, which may display the notification and/or the updated insurance policy information. In this way, an insurance customer may receive updates regarding the impact of a submitted claim on the insured customer's premiums, discounts, etc.

V. Exemplary Method of Utilizing Drone Data

Figure 5:
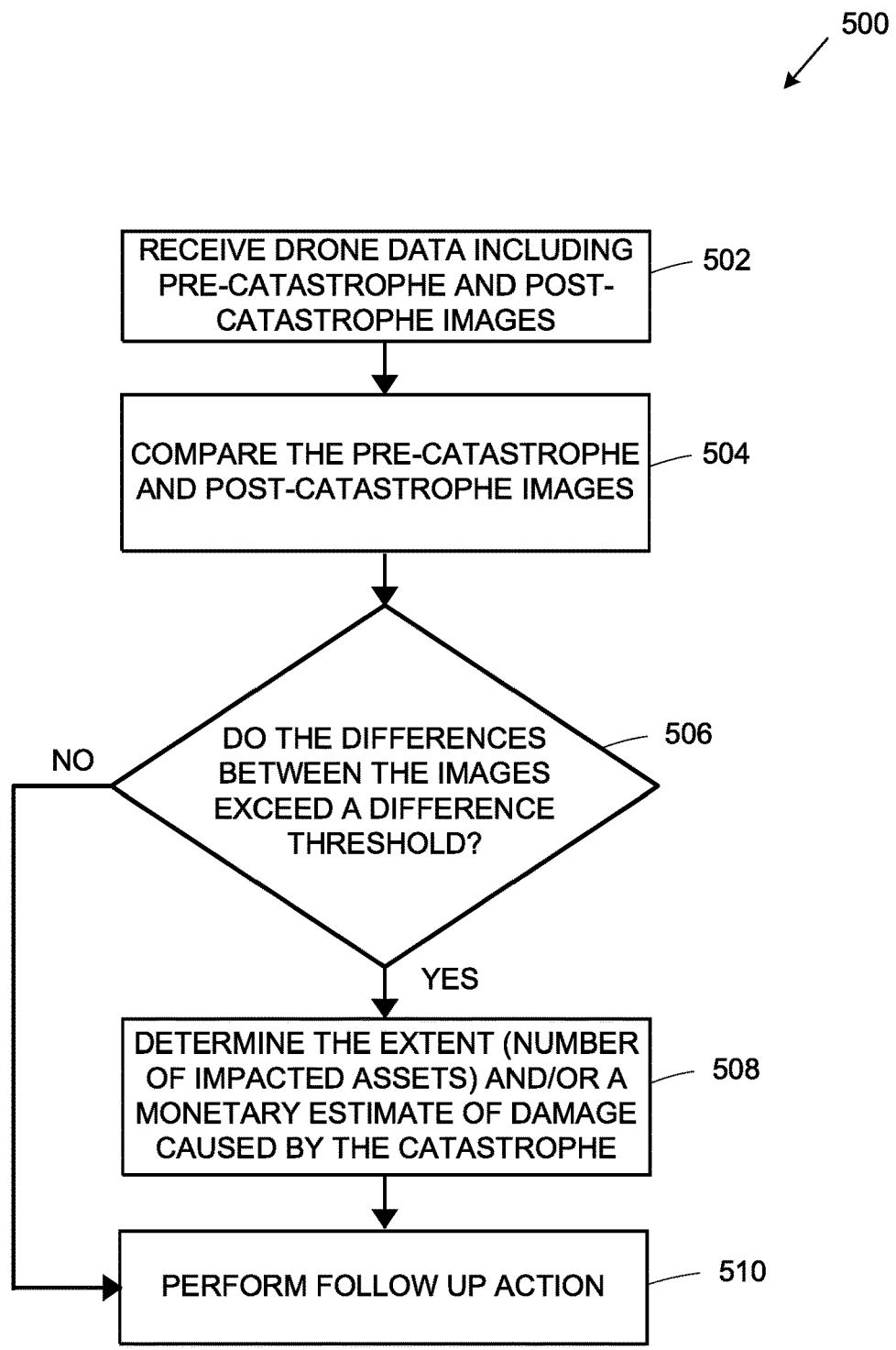
FIG. 5 illustrates an exemplary computer-implemented method 500.

FIG. 5 illustrates an exemplary computer-implemented method 500. In the present aspect, method 500 may be implemented by any suitable computing device (e.g., central monitoring system 150 and/or one or more of external computing devices 160.1-160.M, as shown in FIG. 1). In the present aspect, method 500 may be performed by one or more processors, applications, and/or routines, such as processor 402 executing instructions in one or more modules stored in memory 408, for example, as shown in FIG. 4.

Method 500 may start when one or more processors receive drone data (block 502). This drone data may include, for example, data collected from one or more UAVs that have actively surveyed and/or monitored one or more areas prior to the occurrence of a catastrophe (block 502). This drone data may also include, for example, data collected from one or more UAVs after a catastrophe has occurred, such as data collected by one or more UAVs being dispatched to the scene where property has been damaged due to a catastrophe (block 502). In one aspect, the drone data may include pre-catastrophe and post-catastrophe images associated with an insured property that has been damaged due to a catastrophe (block 502).

Method 500 may include one or more processors comparing the pre-catastrophe and the post-catastrophe images and/or determining a quantifiable difference between the pre-catastrophe and the post-catastrophe images (block 504). This may include, for example, performing a photogrammetric analysis, object recognition, etc., on each of the images as previously discussed with reference to FIG. 4 (block 504). From the analysis of each of the images, aspects include these differences being quantified, for example, due to a percentage difference in coloration, pixel mismatches, lighting, a number of artifacts included in one image but not the other, etc. (block 504).

Method 500 may include one or more processors determining whether the quantified difference between the pre-catastrophe and post-catastrophe images (block 504) exceeds a difference threshold (block 506). This may include, for example, comparing the results of quantified difference (block 504) to a preprogrammed threshold and/or a threshold that is set based upon the types of images that are being compared, the type of insurance claim, the type of catastrophe, the type of damage claim, etc. (block 506). If the quantified difference exceeds the difference threshold, then method 500 may proceed to perform one or more insurer-related functions (block 508). Otherwise, method 500 may proceed to perform a suitable follow up action (block 510).

Method 500 may include one or more processors determining a monetary estimate of damage caused by the catastrophe (block 508). This may include, for example, manual, automatic, and/or semi-automatic estimates of the damage using the pre-catastrophe and the post-catastrophe images and/or the differences between the pre-catastrophe and the post-catastrophe images (block 508). In one aspect, method 500 may include one or more processors determining a monetary estimate if damage based upon the type of insurance claim that is made, the type of property that is damaged, the identified damage from an analysis of the pre-catastrophe images, etc., as previously discussed with reference to FIG. 4 (block 508). In another aspect, method 500 may include insurance personnel examining the pre-catastrophe and the post-catastrophe images and/or the differences between the pre-catastrophe and the post-catastrophe images to determine an estimate of monetary damages (block 508).

Method 500 may include one or more processors performing a suitable follow up action (block 510). In one aspect, this follow up action may be context-based (block 510). For example, if the difference between the pre-catastrophe and the post-catastrophe images do not exceed a difference threshold (block 506), then method 500 may include generating and sending a notification to the insured's mobile computing device (e.g., via an email, text, push notification, etc.) that the damage due to the catastrophe was not significant to support the submission of an insurance claim (block 510). However, if the difference between the pre-catastrophe and the post-catastrophe images do exceed a difference threshold (block 506), then method 500 may include generating and sending a notification to the insured's mobile computing device that indicates the estimated monetary damage, opening an insurance claim using the estimated monetary damage, transferring funds to an account, determining whether a discount is still applicable for the insurance customer, etc. (block 510).

VI. Additional Technical Advantages

In the various aspects described herein, UAV 200, mobile computing device 300, and/or external computing device 400 may facilitate dispatching one or more UAVs to a geographic location, receiving collected drone data, and/or performing one or more actions based upon the received drone data. Additionally or alternatively, these aspects may provide other benefits relating to the technical operation of UAV 200, mobile computing device 300, external computing device 400, and/or the storage devices associated therewith.

For example, external computing device 400 may advantageously analyze pre-catastrophe and post-catastrophe images and/or video data to estimate the monetary damage to insured property caused by a catastrophe. Thus, in accordance with such aspects, external computing device 400 may perform more efficiently by eliminating user error and decreasing the chances that an insurance claim would be erroneously submitted and/or generated with the incorrect damage estimate.

Furthermore, when analyzing the collected drone data (e.g., images) external computing device 400 may execute one or more algorithms to determine the extent of damage caused by a catastrophe and/or a monetary estimate of repairs. Typically, when data is collected by a person and not by a UAV, any images of property damage are taken manually and reviewed manually. But in accordance with the aspects described herein, the collected drone data may provide additional views and, in some cases, additional data that an ordinary camera would not identify (e.g., thermal imaging data). Therefore, because more data is available compared to manually captured images, external computing device 400 may more accurately determine and estimate the extent of damage to property.

One or more UAVs may also be dispatched to a geographic location to collect drone data in an autonomous or semi-autonomous fashion. In traditional insurance claim processing, a claims adjuster would ordinarily need to assess property damage. Using the collected drone data, the time-consuming process of manual claim adjustment may be largely or entirely eliminated. Therefore, the present aspects increase the speed and efficiency in which insurance claims may be processed.

VII. Exemplary Embodiments Directed to Catastrophe Detection, Prevention, and Damage Mitigation In one aspect, a computer-implemented method for providing disaster assistance may be provided. The method may include (1) receiving, at or via one or more processors, a radio or data transmission from a remote radio transmitter indicative of a location of a beacon during a disaster event; (2) deploying, at or via the one or more processors, an unmanned aerial vehicle (UAV) to the location of the beacon via wireless communication or a control transmission transmitted by a radio transceiver associated with the one or more processors; and/or (3) causing or directing, at or via the one or more processors, the UAV to deliver one or more supplies at the location of the beacon to facilitate providing disaster assistance. The method may include additional, fewer, or alternate actions, including those discussed elsewhere herein, and/or may be implemented via one or more local or remote processors, or via computer-executable instructions stored on computer-readable medium or media.

For instance, the supplies may be emergency supplies selected from the group consisting of: survival supplies; and medical supplies. The UAV may be from among a plurality of UAVs, and the method may include deploying the plurality of UAVs to the location of the beacon by the one or more processors via wireless communication or control transmissions transmitted by one or more radio transceivers associated with the one or more processors. The beacon may be part of a smartphone, or other electronics or mobile device capable of radio frequency (RF) wireless communication.

The supplies may include an image capturing device, and the method may further include receiving images, at or via the one or more processors, of a home captured with the image capturing device via the radio or data transmission received from the radio transmitter; and determining, at or via the one or more processors, a homeowners insurance premium using the images and adjusting an associated homeowners insurance policy. The location of the beacon may be associated with a location that is inaccessible by a person. The method may further include facilitating wireless communication between a first person who is located at the inaccessible location and a second person who is located at another location separate from the inaccessible location.

The method may include detecting, at or via the one or more processors, a disaster severity level associated with the location of the beacon from computer analysis of data included in the radio or data transmission received; and/or transmitting, from a transceiver associated with the one or more processors, the severity level to an emergency response authority to facilitate coordinating emergency response.

The method may include accessing, at or via the one or more processors, injuries of one or more people associated with the location of the beacon from computer analysis of data included in the radio or data transmission received; and/or transmitting, from a transceiver associated with the one or more processors, the accessed injuries to an emergency response authority to facilitate emergency response.

The method may include transmitting image data associated with the location of the beacon to another device. The image data may be selected form the group consisting of: visual image data; and thermal image data.

A home may be associated with the location of the beacon, and the method may further include maneuvering the UAV to capture the image data corresponding to a plurality of portions of the home, and wherein the act of transmitting visual image data comprises: transmitting a plurality of visual images corresponding to the plurality of portions of the home. The method may include comparing, at or via the one or more processors, information in a received homeowners insurance claim to damage to the home based upon the plurality of visual images; and/or determining, at or via the one or more processors, whether to perform a fraud investigation based upon the comparison. The method may include receiving, at or via the one or more processors, a radio or data transmission from a radio transmitter associated with a homeowner or homeowners insurance claim in response to damage that has occurred to the home; determining, at or via the one or more processors, a home construction progress based upon the plurality of visual images; and/or updating, at or via the one or more processors, an insurance claim status based upon the determined home construction progress.

In another aspect, a computer-implemented method performed by or in a UAV may be provided. The method may include (1) receiving, at or via a UAV controller mounted on a UAV, commands directing the operation of the UAV via a radio or data transmission transmitted from a remote transceiver or device; (2) maneuvering, at or via the UAV controller, the UAV to a location based upon the commands received and contained within the radio or data transmission; and/or (3) directing or controlling, at or via the UAV controller, a UAV action to mitigate insurance risk, supplement a process, facilitate traffic management, prevent insurance loss, prevent a catastrophe proximate to the location from occurring, mitigate effects of an occurrence of a catastrophe proximate to the location, detect a catastrophe proximate to the location, and/or collect information proximate to the location, in response to receiving the commands contained within the radio or data transmission. The method may include additional, fewer, or alternate actions, including those discussed elsewhere herein.

For instance, the catastrophe may be a fire, and wherein the UAV action directed by the commands contained with the radio or data transmission may be a fire-fighting action selected from the group consisting of: starting a fire to create a fire break; removing material from the location that serves as fuel for the fire; and/or holding a fire hose or watering equipment used to spray water onto the fire.

The method may include capturing, by the UAV or UAV controller, one or more images at the location; determining, by the UAV or UAV controller, if an occurrence of a natural catastrophe within a period of time after the one or more images are captured exceeds a probability threshold based upon the one or more images; and/or transmitting, by the UAV or UAV controller, a wireless communication or radio transmission including a warning notification to another device if the occurrence of the natural catastrophe exceeds the probability threshold. The natural catastrophe may be selected from the group consisting of: mudslides, wildfires, and/or avalanches.

The method may include capturing, by the UAV or UAV controller, one or more images at the location; determining, by the UAV or UAV controller, a severity of damage due to the catastrophe based upon the one or more captured images; and/or transmitting, by the UAV or UAV controller, a wireless communication or radio transmission indicating the severity of damage to another device.

The method may include receiving, by the UAV or UAV controller, meteorological information from another transceiver or device indicative of weather at the location; determining, by the UAV or UAV controller, whether a catastrophe will occur at the location based upon the meteorological information; and/or executing or directing, by the UAV or UAV controller, one or more actions to mitigate damage anticipated to be caused by the catastrophe. The act of executing the one or more actions may include deploying, by the UAV or UAV controller, a barrier to redirect water away from a location to prevent water from causing a flood condition at the location. The commands received from the transceiver or device may be indicative of cellular communications not functioning within an area proximate to the location, and further comprising: communicating, by the UAV or UAV controller, with a cellular device to enable cellular communications for compatible devices within an area proximate to the location in response to the commands received from the device.

The method may include detecting, by the UAV or UAV controller, a signal strength of a signal transmitted in accordance with a Wi-Fi communications protocol at the location. The method may include broadcasting, by the UAV or UAV controller, an emergency message upon arriving at the location. The action may include: providing light, by the UAV or UAV controller, to an area associated with the location. The location may be from among a plurality of locations, and further comprising: capturing, by the UAV or UAV controller, a pre-catastrophe and a post-catastrophe plurality of images corresponding to a plurality of homes associated with the plurality of locations prior to and subsequent to an occurrence of the catastrophe proximate to the location, respectively; transmitting, by the UAV or UAV controller, the pre-catastrophe and a post-catastrophe plurality of images to a computing device; comparing, by the computing device, the pre-catastrophe and a post-catastrophe plurality of images; and/or determining, by the computing device, an estimate of damage incurred by the catastrophe based upon the comparison of the pre-catastrophe and a post-catastrophe plurality of images. The method may include setting a reserve amount of money in an insurer account based upon the estimate of damage in anticipation of insurance claims being filed.

The method may include capturing, by the UAV or UAV controller, a pre-catastrophe and a post-catastrophe image corresponding to a home associated with the location prior to and subsequent to an occurrence of the catastrophe proximate to the location, respectively; transmitting, by the UAV or UAV controller, the pre-catastrophe and the post-catastrophe of image to a computing device; comparing, by the computing device, the pre-catastrophe image and the post-catastrophe image; and/or determining, by the computing device, an estimate of damage incurred by the catastrophe based upon the comparison of the pre-catastrophe image and the post-catastrophe image.

The method may include comparing, by the computing device, the estimate of damage incurred by the catastrophe to a claim amount filed by an insured associated with the home; and flagging the claim amount for further investigation when the estimate of damage and the claim amount differ in excess of an error threshold.

The action may include landing, by the UAV or UAV controller, at a home property associated with the location; retrieving, by the UAV or UAV controller, a soil sample at the home property; analyzing, by the UAV or UAV controller, the soil sample to determine a soil water content; and/or transmitting, by the UAV or UAV controller, the soil water content to a computing device. The method may include determining, by the computing device, a number of sump pumps that are needed and/or a sump pump minimum power rating, and/or whether the homeowner should have a backup sump pump.

The action may include recording, by the UAV or UAV controller, video data associated with the location; transmitting, by the UAV or UAV controller, the video data to a computing device; and/or detecting, by the computing device, whether fraudulent insurance claim activity has occurred based upon the video data. The action may be recording, by the UAV or UAV controller, video data associated with the location, and/or wherein the location is associated with a high risk of danger to a person due to suspected arson or use of explosives.

Additionally or alternatively, the methods discussed herein may all include adjusting or generating an insurance premium or discount based upon a home owner or an insured having the functionality discussed herein. As a result, risk averse insurance customers with damage mitigation or prevention equipment may receive insurance premium discounts.

In one aspect, a computer-implemented method performed or carried out by a UAV is provided. The method may include (1) maneuvering, at or via the UAV or a UAV controller, the UAV to a location based upon a first set of commands received from a first device; and/or (2) communicating, at or via the UAV or UAV controller, with a second device in response to receiving a second set of commands from the first device, wherein the second set of commands are sent to the UAV or UAV controller when a catastrophe condition (or triggering loss event) is detected at the location by the first device, and/or wherein the second device is utilized by a user acting in response to the catastrophe condition (or triggering loss event). The method may include additional, fewer, or alternate actions, including those discussed elsewhere herein, and may be implemented via one or more processors.

For instance, the location may be associated with a plurality of houses, wherein the catastrophe condition (or triggering loss event) may be a wildfire or other type of fire, and the method further comprising: detecting, by the UAV or UAV controller, movement within a house from among the plurality of houses; determining, by the UAV or UAV controller, whether the movement matches a movement profile associated with a fire inside a house; identifying, by the UAV or UAV controller, a location of the house when the movement matches the movement profile; and/or transmitting, by the UAV or UAV controller, the location of the house to the second device. The user may be an emergency response personnel, and wherein the catastrophe condition is a wildfire in a house at the location, and the method may further include deploying, by the UAV or UAV controller, an apparatus to the house to provide the emergency response personnel assistance with evacuation of one or more people from the house. The triggering event may include a car crash, and wherein the user is a non-emergency response personnel, and the method may further include sending, by the non-emergency response personnel, communications to an emergency response personnel upon receiving communications at the second device from the UAV or UAV controller indicative of the location of the triggering event.

The second device may be an ambulance, and wherein the user is an emergency response personnel, and the method may further include determining, by the UAV or UAV controller, a distance between the ambulance and the location of the catastrophe; and/or transmitting, by the UAV or UAV controller, information to the ambulance when the distance is less than a threshold distance.

In another aspect, a computer-implemented method may include (1) receiving, at or via one or more processors, a wireless communication or data transmission including data indicative of a triggering event, the triggering event being an emergency, breach of security, and/or risk of harm to a person, the triggering event further being associated with a geographic location; (2) deploying, at or via the one or more processors, an unmanned aerial vehicle (UAV) to the geographic location if the UAV is not at the geographic location when the data indicative of the triggering event is received; and/or (3) receiving, at or via the one or more processors, a radio transmission or information from the UAV or UAV controller associated with the triggering event. The method may include additional, fewer, or alternate actions, including those discussed elsewhere herein.

For example, the triggering event may include activation of a home security alarm, and/or wherein the radio transmission or information received from the UAV or UAV controller includes images of the inside of the home indicative of whether the home alarm activation is a true or a false alarm condition. The triggering event may include a command received from a device indicating a location to be monitored by the UAV or UAV controller, and wherein the location is selected from the group consisting of: a school; geographic area proximate to the location; playground; natural body of water; pool or waterpark; sporting arena; prison; parking garage; an automated teller machine (ATM) location; a crowd of people; and/or a dwelling.

The radio transmission or information received from the UAV or UAV controller may include images of the geographic location. The triggering event may be detected by the UAV or UAV controller, and wherein the triggering event may be selected from the group consisting of: an identified vehicle; a gunshot; a human scream; an explosion; sounds and/or images associated with collapse of a structure; sounds and/or images associated with a person drowning; images and/or sensor data associated with a presence of an explosive device; issuance of an amber alert; activation of a security alert proximate to the geographic location; and/or biometric information associated with a high risk behavior. The method may include pursuing, by the UAV, the identified vehicle; and/or sending, by the UAV or UAV controller, the radio transmission or information as video images of the identified vehicle to another device while pursuing the identified vehicle.

The method may include sending, by one or more processors, commands to the UAV or UAV controller; and/or initiating a crowd-control action in response to the received commands. The method may include monitoring, by the UAV or UAV controller, wireless communications sent and/or received by a cellular phone associated with the geographic location, and/or wherein the radio transmission or information received from the UAV or UAV controller may include data or information corresponding to a monitored cellular phone conversation including audio and short message service (SMS) communications. The method may include deploying, by the UAV or UAV controller, a beacon at the geographic location, wherein the beacon may broadcast data indicative of the geographic location. The method may include coupling, by the UAV or UAV controller, the UAV to a power source via a tether; and/or receiving power, by the UAV or UAV controller, from the power source via the tether.

The act of executing the action to collect information proximate to the location may include transmitting, by the UAV or UAV controller, information to another device. The radio transmission or information transmitted by the UAV or UAV controller to another transceiver or device may include images of a home, and the method may include generating, by one or more processors, a homeowners insurance quote estimate based upon the images of the home. The images of the home may include shrubs or trees near the home, and the method may include determining, by the one or more processors, a fire risk profile based upon the images of the home. The act of determining the homeowners insurance quote estimate may include determining the initial homeowners insurance quote estimate based upon the fire risk profile.

The radio transmission or information transmitted by the UAV or UAV controller to another device may be selected from a group consisting of: images of an inside of a building; images of an inside of a part of a sewage system; images of an inside of part of a subway system; images corresponding to a geofenced area proximate to the geographic location; images of one or more parts of a building; images indicative of proximity of fire hydrants to a building; thermal images of a roof of a building; images of a garaged car location associated with a building; images taken concurrent with delivery of a product by a delivery service; and/or images of infrastructures used by a municipality.

The method may include landing, by the UAV or UAV controller, the UAV at the geographic location; retrieving, by the UAV or UAV controller, one or more images at the geographic location; analyzing, by the UAV or UAV controller, the one or more images to determine a degree of tree root damage; and/or transmitting, by the UAV or UAV controller, the degree of tree root damage to a computing device as the information relevant to mitigating insurance risks, preventing insurance loss, and/or assessment of a geographic location. The method may include generating, by the computing device, a homeowner's insurance premium quote based upon the degree of tree root damage. The method may include receiving, by the UAV or UAV controller, utility usage information from a utility service provider device located at the geographic location; and/or transmitting, by the UAV or UAV controller, the utility usage information to a computing device as the information relevant to mitigating insurance risks, preventing insurance loss, and/or assessment of a geographic location.

In another aspect, a computer-implemented method in an unmanned aerial vehicle (UAV) may be provided. The method may include receiving, at or via a UAV or UAV controller, a data transmission or wireless communication including commands from a computing device; determining, at or via the UAV or UAV controller, a geofenced geographic location based upon the received commands; monitoring, at or via the UAV or UAV controller, information associated with an airspace confined by the geofenced geographic location; and/or transmitting, at or via the UAV or UAV controller, the information to a central monitoring system via a radio transmission.

The act of monitoring may include logging, at or via the UAV or UAV controller, a plurality of flight times corresponding to how long each of a plurality of respective UAVs has been flying; and/or transmitting, at or via the UAV or UAV controller, the plurality of flight times to the central monitoring system as the information. The act of monitoring may include receiving, at or via the UAV or UAV controller, data collected by a plurality of respective UAVs; and/or transmitting, at or via the UAV or UAV controller, the data to the central monitoring system as the information. The airspace confined by the geofenced geographic location may have a ceiling of 400 feet.

The act of executing an action to collect information proximate to the location may comprise collecting, at or via the UAV or UAV controller, meteorological information such that the UAV functions as a mobile weather station; and/or transmitting, at or via the UAV or UAV controller, the meteorological information to a central monitoring system. The method may include determining, at or via the central monitoring system, if severe weather conditions are imminent based upon the meteorological information; sending, at or via the central monitoring system, additional commands to the UAV via wireless communication; and/or maneuvering, at or via the UAV or UAV controller, the UAV to another location that is not subject to the severe weather conditions based upon the additional commands.

The method may include determining, at or via the central monitoring system, if severe weather conditions are imminent based upon the meteorological information; and/or broadcasting, at or via the central monitoring system, a warning message indicative of the severe weather conditions. The UAV may be from among a plurality of UAVs, and wherein the act of executing the action to collect information may include receiving, at or via the UAV or UAV controller, wireless communication or data transmissions from the plurality of UAVs, and the method may further include determining, at or via the UAV or UAV controller, a location of the plurality of other UAVs based upon the data.

The method may include navigating, by the UAV or UAV controller, the UAV among the other plurality of UAVs such that collisions are avoided between the UAV and the plurality of UAVs based upon the location of the plurality of other UAVs. The act of receiving may include receiving the wireless communication or data transmissions from the plurality of UAVs in accordance with a standard communication protocol.

The method may include transmitting, by the UAV or UAV controller, task assignment information; and/or executing, by the plurality of other UAVs, an action to mitigate insurance risk, supplement a process, prevent insurance loss, prevent a catastrophe proximate to the location from occurring, mitigate effects of an occurrence of a catastrophe proximate to the location, detect a catastrophe proximate to the location, and/or collect information proximate to the location, in response to receiving the task assignment information from the UAV. The task assignment information may include instructions to display one or more advertising or emergency messages. The location may be associated with a field of crops, and wherein the act of executing the action to supplement the process may comprise one or more of: crop dusting the field of crops in response to receiving the commands; and/or capturing thermal image data representative of crop temperature.

The location may be associated with a group of farm animals, and wherein the act of executing the action to supplement the process may comprise herding the group of farm animals in response to receiving the commands. The act of executing the action to supplement a process may include displaying advertising information. The location may be associated with a roadway, and wherein the act of executing the action to collect information may include monitoring, by the UAV or UAV controller, the roadway to determine one or more parameters corresponding to use of the roadway.

The one or more parameters may comprise one or more of: a number of vehicles and/or a speed of vehicles traversing a monitored portion of the roadway during a period of time. The method may include transmitting, by the UAV or UAV controller, the one or more parameters to a central monitoring system; determining, by the central monitoring system, an advertising message based upon the one or more parameters; transmitting, by the central monitoring system, data representative of the advertising message to the UAV; and/or displaying, by the UAV or UAV controller, the advertising message based upon the data.

The act of executing the action to collect information may include detecting odors present at the location; and/or transmitting, by the UAV or UAV controller, data to a central monitoring system representative of the odors. The location may be associated with a vehicle, and the method may include tethering, by the UAV or UAV controller, the UAV to the vehicle, and wherein the act of executing the action to collect information proximate to the vehicle may comprise capturing, by the UAV or UAV controller, one or more images of traffic proximate to the vehicle. The location may be associated with a vehicle, and wherein the act of executing the action to mitigate effects of an occurrence of a triggering event proximate to the vehicle may include deploying a flare when the vehicle is involved in a vehicle collision with another vehicle.

The act of executing the action to facilitate traffic management may include transmitting, by the UAV or UAV controller, traffic management information to a traffic management device, and the method may include adjusting, by the traffic management device, a traffic management display indicator based upon the traffic management information. The act of executing the action to facilitate traffic management may be selected from the group consisting of: determining speed information corresponding to one or more vehicles; transmitting vehicle speed information to a central monitoring system; determining vehicle collision information; transmitting vehicle collision information to a central monitoring system; transmitting traffic routing information to an autonomous vehicle; determining a time period corresponding to how long a vehicle has been parked at the location; and/or transmitting a time period corresponding to how long a vehicle has been parked at the location to a central monitoring system.

In one aspect, a computer-implemented method may include (1) receiving, at or via a central monitoring system, data from an unmanned aerial vehicle (UAV) or UAV controller via wireless communication or data transmission; (2) determining, at or via the central monitoring system, a battery charge level of a battery associated with the UAV and a geographic location of the UAV based upon the data; (3) determining, at or via the central monitoring system, a battery charging location within flight range of the UAV based upon the geographic location of the UAV and the battery charge level; (4) routing, at or via the central monitoring system, a flight path from the UAV to the battery charging location; and/or (5) transmitting, at or via the central monitoring system, a command to the UAV or UAV controller to cause the UAV to follow the flight path to the battery charging location and to charge the battery utilizing a battery charger located at the battery charging location. The method may include additional, fewer, or alternate actions, including those discussed elsewhere herein.

For instance, the battery charger may be a docking station. The battery charging location may include a power line carrying an alternating current, and the method may include landing, by the UAV or UAV controller, the UAV on the power line in response to receiving the command; converting, by the UAV or UAV controller, the alternating current carried by the power line to a direct current; and/or charging, by the UAV or UAV controller, the battery using the direct current.

In one aspect, a computer-implemented method in, or performed by, an unmanned aerial vehicle (UAV) may include (1) receiving, at or via a UAV or UAV controller, a command from a motorized device used to assist a disabled person via a wireless communication or data transmission; and/or (2) executing, directing, or controlling, at or via the UAV or UAV controller, an action to render assistance to the disabled person based upon the command, the action being performed by the UAV, motorized device, or other smart device. The method may include additional, fewer, or alternate actions, including those discussed elsewhere herein.

For instance, the method may include (3) tracking, at or via the UAV or UAV controller, a laser pointed at an object; (4) retrieving, at or via the UAV or UAV controller, the object once the laser is focused on the object for a period of time exceeding a threshold time period; and/or (5) delivering, at or via the UAV or UAV controller, the object to the disabled person once the object is retrieved. The method may include retrieving, at or via the UAV or UAV controller, an object based upon the command; and/or delivering, at or via the UAV or UAV controller, the object to the disabled person once the object is retrieved.

The command may include a geographic location, and/or the method may further include maneuvering, by the UAV or UAV controller, the UAV to the geographic location; collecting, by the UAV or UAV controller, sensory data at the geographic location; and/or transmitting, by the UAV or UAV controller, the sensory data to the motorized device. The sensory data may be selected from the group consisting of: images; video; and/or sound. The method may further include displaying, by the motorized device, the sensory data such that it is viewable by the disabled person.

VIII. Exemplary Embodiments Directed to UAV Functionality in the Event of a Catastrophe In one aspect, a computer-implemented method of providing disaster assistance using drones and/or drone data may be provided. The method may include (1) dispatching, via one or more processors, one or more drones to a disaster area using wireless communication or data transmissions; (2) receiving image, audio, infrared, and/or other drone data, at or via a remote server associated with an insurance provider, from the one or more drones (or drone transceivers) via wireless communication or data transmission, the drone data received recording, showing, capturing, detailing, or otherwise being associated with a scene of a natural disaster (e.g., hurricane, earthquake, tsunami, wildfire, mudslide, avalanche, other disaster, and/or industrial, chemical, or nuclear accident) and being generated, collected, captured, or gathered by the one or more drones (and/or associated drone sensors, cameras, imaging devices, audio or visual recording devices, and/or other drone-mounted electronic devices) before, during, and/or after the natural disaster, the natural disaster endangering, damaging, impacting, or effecting an insured or insured asset covered by an insurance policy issued by the insurance provider; (3) analyzing, at or via the remote server, the drone data received; (4) identifying, at or via the remote server, an insured or insured asset at risk or in danger because of the natural disaster based upon the analysis of the drone data; and/or (5) directing or controlling via wireless communication, at or by the remote server, the delivery of disaster assistance via the one or more drones to the insured or insured asset at risk or in danger because of the natural disaster. The method may include additional, fewer, or alternate actions, including those discussed elsewhere.

For example, the method may include determining, at or via the remote server, an estimated amount of damage (wind, fire, flooding, water, hail, or other damage) to the insured asset from analysis of the drone data; generating, at or via the remote server, an estimated insurance claim for the insured asset from the estimated amount of damage; and/or causing, at or via the remote server, the estimated insurance claim to be presented to the insured for review, approval, or modification via wireless communication. The method may include determining, at or via the remote server, an estimated severity of the natural disaster from analysis of the drone data; and/or redirecting, at or via the remote server, the one or more drones based upon the estimated severity of the natural disaster using wireless communication. The method may include determining, at or via the remote server, an estimated amount of damage to the insured asset from analysis of the drone data; and/or updating or adjusting, at or via the remote server, a premium, rate, discount, or reward for an insurance policy covering the insured asset based upon the estimated amount of damage to the insured asset and/or drone data analysis.

The disaster assistance delivered by the one or more drones may include an emergency beacon, mobile device or smart phone, or other wireless communication device. The disaster assistance delivered by the one or more drones may include a survival kit, medical supplies, water, blankets, flashlights, or food. The disaster assistance delivered by the one or more drones may include a rope, parachute, or zipline. The disaster assistance delivered by the one or more drones may include a sandbag or other flood mitigation item. The disaster assistance delivered by the one or more drones may include a camera to facilitate the insured taking pictures of a damaged insured asset, such as a home or other structure, and the method includes handling an insurance claim using the pictures taken.

The drone data received and analyzed at or via the remote server may include infrared data, and the insured that is at risk or in danger may be identified and/or located via the infrared data. The drone data received and analyzed at or via the remote server may include infrared or thermal imaging data, and the insured that is at risk or in danger may be identified, from analysis of the infrared or thermal imaging data, to be located in a burning building, elevator shaft, grain elevator or silo, cave, or other area associated with an increased risk. The insured that is at risk or in danger may be identified and/or located via analysis of the drone data by determining, at or via the remote server, that the insured is injured or in area of high risk.

The method may include identifying, at or via the remote server, multiple persons as being at risk or in danger because of the natural disaster from analysis of the drone data; ranking, at or via the remote server, the multiple persons in order according to whom is determined to be at the most risk or in the most danger; and/or directing or controlling, at or via the remote server, the one or more drones to deliver disaster assistance first to those determined to be at the most risk or in the most danger.

The disaster assistance delivered by the one or more drones may include or entail dropping water or directing hoses or other watering equipment to drop water onto a wildfire and/or a roof of a house in a path of a wildfire. The disaster assistance delivered by the one or more drones may include or entail creating a fire wall and/or sawing down trees to create a fire break to stop a wildfire or steer a path of a wildfire. The disaster assistance delivered by the one or more drones may include or entail providing temporary networking and/or wireless communication, such as providing local 3G/4G functionality and/or reception.

The disaster assistance delivered by the one or more drones may include or entail providing recommendations as to how to respond to the natural disaster, including where to go and/or what to do, and/or information as to the extent of the natural disaster. The disaster assistance delivered by the one or more drones may include or entail directing, such as via intelligent routing, emergency responders, such as police, fire fighters, or medical personal to the insured or insured asset. The disaster assistance delivered by the one or more drones may include or entail providing temporary lighting from one or more tethered drones over an area associated with the natural disaster.

The method may include determining, at or via the remote server, an estimated amount of damage to all of the insured assets damaged by the natural disaster and covered by insurance policies issued by the insurance from analysis of the drone data. The method may include determining, at or via the remote server, estimated or total losses for insured assets caused by the natural disaster and/or associated wind, water, flooding, or fire from analysis of the drone data; generating, at or via the remote server, estimated claims for the insured or owner of the insured assets from the estimated or total losses; and/or paying, at or via the remote server, monies associated with the estimate claims to the insured or owner of the insured assets to facilitate providing prompt relief to customers of the insurance provider.

In another aspect, a computer-implemented method of identifying a risk of a natural disaster using drones and/or drone data may be provided. The method may include (1) dispatching, via one or more processors, one or more drones to a disaster area using wireless communication; (2) receiving image, audio, infrared, and/or other drone data, at or via a remote server (and/or one or more remote processors) associated with an insurance provider, from the one or more drones (or drone transmitters) via wireless communication, the drone data received recording, showing, capturing, detailing, or otherwise being associated with a geographical area; (3) analyzing, at or via the remote server, the drone data received; (4) identifying, at or via the remote server, a risk or an increased risk of a natural disaster associated with the geographical area, such as a hurricane, earthquake, tsunami, wildfire, mudslide, avalanche, snow storm, blizzard, flash flooding, ice storm, sink hole, other disaster, and/or industrial, chemical, or nuclear accident based upon analysis of the drone data; (5) determining, at or via the remote server, that the risk or increased risk of the natural disaster is endangering, damaging, impacting, or effecting an insured or insured asset covered by an insurance policy issued by the insurance provider; (6) generating a recommendation or warning, at or via the remote server, regarding the risk or increased risk of the natural disaster; and/or (7) causing the recommendation or warning, at or via the remote server, to be communicated to the insured or owner of the insured asset at risk or increased risk, such as via wireless communication. The method may include updating or adjusting, at or via the remote server, a premium, rate, reward, or discount for the insurance policy of the insured or for the insured asset based upon the risk or increased risk of natural disaster, and/or the risk mitigation functionality discussed herein. The method may include additional, fewer, or alternate actions, including those discussed elsewhere herein.

In one aspect, the UAVs or drones discussed herein may be smart UAVs or smart drones, and/or may include various electronic componentry, include UAV or drone controllers; processors; transmitters; receivers; transceivers; batteries; power units; memory units; sensors; audio, visual, or video recorders; cameras; imaging equipment; and/or other components. The UAVs or drones, and/or UAV or drone controllers, may be configured for Radio Frequency (RF) one or two-way wireless communication and/or radio or data transmissions. The UAVs or drones, and/or UAV or drone controllers, may use standard or other RF communication techniques to communication with remote insurance provider or other servers or processors.

IX. Exemplary Method of Determining a Monetary Estimate of Damages Incurred by a Catastrophe or Disaster In one aspect, a computer-implemented method of determining a monetary estimate of damage incurred by a catastrophe or disaster may be provided. The method may include one or more processors receiving drone data via wireless communications. The drone data may be generated by one or more drones and include a pre-catastrophe and a post-catastrophe image of a structure (e.g., a house, high rise building, garage, etc.) prior to and subsequent to an occurrence of a catastrophe at the structure's location, respectively. The method may include comparing the pre-catastrophe image and the post-catastrophe image, and determining a monetary estimate of damage incurred by the catastrophe based upon the comparison of the pre-catastrophe image and the post-catastrophe image. The structure may be covered by an insurance policy issued by an insurance provider to an insured customer. The method may also include generating, by one or more processors, a proposed virtual insurance claim based upon the monetary estimate of damage; and/or transmitting, under the direction and control of the one or more processors, the proposed virtual insurance claim to a mobile device of the insurance customer for their review such that handling of insurance claims for property damaged by a catastrophe is facilitated and the online customer experience is enhanced. The method may include additional, fewer, or alternate actions, including those discussed elsewhere.

The method may additionally or alternatively include one or more processors transferring a reserve amount of money into an insurer account based upon the estimate of damage in anticipation of insurance claims being filed.

The method my also include an insurer submitting a claim to the insurer, in which case the method may include one or more processors receiving the insurance claim submitted by the insured customer, which may include a claim amount. Upon receipt of the insurance claim, the method may include one or more processors comparing the monetary estimate of damage incurred by the catastrophe to the claim amount and flagging the insurance claim for further investigation when the monetary estimate of damage and the claim amount differ in excess of an error threshold.

Additionally or alternatively, the drone data may include data associated with one or more variables outside of the structure indicative of a level of risk of damage to the home in the event of a future catastrophe. The variables may include, for example, a distance between the home and vegetation outside the home. The method may include one or more processors analyzing the drone data to assess the level of risk, and notifying the insured customer of one or more options to reduce the level of risk, which may include sending a notification to a mobile computing device associated with the insured customer. The options to reduce the level of risk included in the notification may include, for example, recommending a minimum distance between the structure and vegetation outside the structure to mitigate wildfire risk based upon the distance between the structure and vegetation outside the structure.

Additionally or alternatively, the drone data may include video data of the structure, and the method may include one or more processors analyzing the video data of the structure to identify activity associated with a fraudulent insurance claim.

X. Exemplary External Computing Device

In another aspect, an external computing device may be provided. The external computing device may include a communication unit configured to receive drone data via wireless communications. The drone data may be generated by one or more drones and include a pre-catastrophe and a post-catastrophe image of a home prior to and subsequent to an occurrence of a catastrophe at the structure's location, respectively. The external computing device may also include a processor configured to compare the pre-catastrophe image and the post-catastrophe image, and to determine a monetary estimate of damage incurred by the catastrophe based upon the comparison of the pre-catastrophe image and the post-catastrophe image. The structure may be covered by an insurance policy issued by an insurance provider to an insured customer. The processor may be further configured to generate a proposed virtual insurance claim based upon the monetary estimate of damage; and/or direct the transmission, via wireless communication, of the proposed virtual insurance claim to a mobile device of the insurance customer for their review such that handling of insurance claims for property damaged by a catastrophe is facilitated. The external computing device may include additional, fewer, or alternate elements, including those discussed elsewhere.

The processor may additionally or alternatively be configured to transfer a reserve amount of money into an insurer account based upon the estimate of damage in anticipation of insurance claims being filed.

The communication unit may also be configured, in the event that an insurer submits a claim to the insurer, to receive the insurance claim submitted by the insured customer, which may include a claim amount. Upon receipt of the insurance claim, the processor may be further configured to compare the monetary estimate of damage incurred by the catastrophe to the claim amount and flag the insurance claim for further investigation when the monetary estimate of damage and the claim amount differ in excess of an error threshold.

Additionally or alternatively, the drone data may include data associated with one or more variables outside of the home indicative of a level of risk of damage to the structure in the event of a future catastrophe. The variables may include, for example, a distance between the structure and vegetation outside the structure. The processor may be configured to analyze the drone data to assess the level of risk, and the communication unit may be configured to notify the insured customer of one or more options to reduce the level of risk, which may include sending a notification to a mobile computing device associated with the insured customer. The options to reduce the level of risk included in the notification may include, for example, recommending a minimum distance between the structure and vegetation outside the structure to mitigate wildfire risk based upon the distance between the structure and vegetation outside the structure.

Additionally or alternatively, the drone data may include video data of the structure, and the processor may be configured to analyze the video data of the structure to identify activity associated with a fraudulent insurance claim.

XI. Exemplary Non-Transitory Computer Readable Media

In still another aspect, a non-transitory computer readable media is provided. The non-transitory computer readable media may have instructions stored thereon that, when executed by a processor, cause the processor to receive drone data via wireless communications. The drone data may be generated by one or more drones and include a pre-catastrophe and a post-catastrophe image of a structure prior to and subsequent to an occurrence of a catastrophe at the structure's location, respectively. The non-transitory computer readable media may also have instructions stored thereon that, when executed by a processor, cause the processor to compare the pre-catastrophe image and the post-catastrophe image, and to determine a monetary estimate of damage incurred by the catastrophe based upon the comparison of the pre-catastrophe image and the post-catastrophe image. The structure may be covered by an insurance policy issued by an insurance provider to an insured customer. The non-transitory computer readable media may also have instructions stored thereon that, when executed by a processor, cause the processor to generate a proposed virtual insurance claim based upon the monetary estimate of damage; and/or direct the transmission, via wireless communication, of the proposed virtual insurance claim to a mobile device of the insurance customer for their review such that handling of insurance claims for property damaged by a catastrophe is facilitated. The non-transitory computer readable media may include additional, fewer, or alternate instructions, including those discussed elsewhere.

The non-transitory computer readable media may additionally or alternatively include instructions that, when executed by a processor, cause the processor to transfer a reserve amount of money into an insurer account based upon the estimate of damage in anticipation of insurance claims being filed.

The non-transitory computer readable media may, in the event that an insurer submits a claim to the insurer, include instructions that, when executed by a processor, cause the processor to receive the insurance claim submitted by the insured customer, which may include a claim amount. Upon receipt of the insurance claim, the non-transitory computer readable media may include instructions that, when executed by the processor, cause the processor to compare the monetary estimate of damage incurred by the catastrophe to the claim amount and flag the insurance claim for further investigation when the monetary estimate of damage and the claim amount differ in excess of an error threshold.

Additionally or alternatively, the drone data may include data associated with one or more variables outside of the structure indicative of a level of risk of damage to the structure in the event of a future catastrophe. The variables may include, for example, a distance between the structure and vegetation outside the structure. The non-transitory computer readable media may include instructions that, when executed by the processor, cause the processor to analyze the drone data to assess the level of risk and to notify the insured customer of one or more options to reduce the level of risk, which may include sending a notification to a mobile computing device associated with the insured customer. The options to reduce the level of risk included in the notification may include, for example, recommending a minimum distance between the structure and vegetation outside the structure to mitigate wildfire risk based upon the distance between the structure and vegetation outside the structure.

Additionally or alternatively, the drone data may include video data of the structure, and the non-transitory computer readable media may include instructions that, when executed by the processor, cause the processor to analyze the video data of the structure to identify activity associated with a fraudulent insurance claim.

XII. Additional Considerations

UAVs are described throughout the disclosure as being dispatched, deployed, or otherwise instructed to travel to one or more locations to perform various functions. As will be appreciated by those of ordinary skill in the relevant art(s), UAVs may be instructed to navigate to a specific location via any suitable techniques, such as referencing a postal address, a landmark, a location received in terms of latitude and longitude coordinates, etc. When a UAV is instructed to navigate to a geographic location and/or to perform various functions associated with a geographic location, the geographic location may defined in any suitable manner, such as a geofenced coordinate boundary, for example. Regardless of the specific purpose of the information collected by a UAV as further provided below, a UAV may receive instructions, collect information, execute various actions, store information, and/or transmit collected information in any suitable manner.

Furthermore, throughout the disclosure, functions to be performed by one or more UAVs may be explained as being performed by a single UAV, such as UAV 200, for example, for purposes of brevity. In the aspects described herein, any described aspects may be performed by a single UAV or any suitable number of additional UAVs. The number of UAVs used to collect data may be based upon the size of the vehicle collision, the number of vehicles involved, the time-sensitive nature regarding when the data needs to be collected, etc.

In some aspects, the various UAV functions may be performed by UAVs maneuvering with or without a tethered system. For example, in some aspects, one or more UAVs may fly untethered to carryout various functions. In other aspects, however, one or more UAVs may utilize a tethering system while flying (or other means of locomotion) within a radius governed by the length of the tether. Such tethering systems may be particularly useful, for example, when higher power requirements are required, such that one or more UAVs may receive power via the tether instead of draining their respective internal batteries. UAV 200 may include additional, fewer, or alternate actions, including those discussed elsewhere herein.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or temporarily configured circuitry (e.g., configured by software) may be driven by cost/time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing." "computing." "calculating." "determining." "presenting," "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising." "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for executing actions with one or more UAVs, collecting information via one or more UAVs, and/or and utilizing this collected information through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

This detailed description is to be construed as exemplary only and does not describe every possible embodiment, as describing every possible embodiment would be impractical, if not impossible. One may be implement numerous alternate embodiments, using either current technology or technology developed after the filing date of this application.

With the foregoing, an insurance customer may opt into a rewards, insurance discount, or other type of program. After the insurance customer provides their affirmative consent, an insurance provider drone or UAV may collect image data of insured assets after (and/or before) an insurance-related event, including those events discussed elsewhere herein. In return, risk averse drivers, and/or vehicle or home owners may receive discounts or insurance cost savings related to auto, home, and other types of insurance from the insurance provider.

In one aspect, drone or UAV data, and/or other data, including the types of data discussed elsewhere herein, may be collected or received by an insurance provider remote server, such as via direct or indirect wireless communication or data transmission from a drone or UAV, after a customer affirmatively consents or otherwise opts into an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles or homes, and/or (ii) vehicle operators or passengers, or home occupants.

The present embodiments may also facilitate risk assessment and premium determination for vehicle or home insurance policies. For instance, a consumer may opt-in to a rewards program that rewards them, such as in the form of insurance discounts, for sharing data related to their vehicle and/or home features with an insurance provider, both before and after an insurance-related event. Also, more efficient online insurance claim handling and/or processing may be provided, as well as proposed insurance claim pre-generation.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. An unmanned aerial vehicle (UAV) comprising:
a display;
a speaker;
a processor; and
a non-transitory computer-readable memory coupled with the processor, the non-transitory computer-readable memory storing executable instructions that when executed by the processor cause the processor to:
transmit data indicative of a battery charge level of a battery associated with the UAV from the UAV to a server device as the UAV is en route to a destination location;
receive a flight path, from the server device in response to the data indicative of the battery charge level as the UAV is en route to the destination location, to a power supply device within a flight range of the UAV, wherein the flight range is based upon a geographic location of the UAV and the battery charge level of the battery associated with the UAV; and
operate based on the flight path, including:
docking the UAV with the power supply device for charging the battery associated with the UAV including:
landing the UAV on a power line carrying an alternating current;
converting the alternating current carried by the power line to a direct current; and
charging the battery associated with the UAV using the direct current; and
upon arriving at the destination location, provide, via the speaker and/or the display, a recommendation to one or more people at the destination location on how to respond to a natural disaster at the destination location.

2. The UAV of claim 1, wherein the instructions further cause the processor to:
receive a command to follow the flight path to a location of the power supply device and to charge the power supply utilizing the power supply device at the power supply device location.

3. The UAV of claim 1, wherein the instructions further cause the processor to:
couple the UAV to the power supply device via a tether.

4. A computer-implemented method for charging a power source of an unmanned aerial vehicle (UAV), the method comprising:
transmitting, by one or more processors in a UAV, data indicative of a battery charge level of a battery associated with the UAV from the UAV to a server device as the UAV is en route to a destination location;
receiving, by the one or more processors as the UAV is en route to the destination location, a flight path, from the server device in response to the data indicative of the battery charge level, to a power supply device within a flight range of the UAV, wherein the flight range is based upon a geographic location of the UAV and the battery charge level of the battery associated with the UAV; and
operating, by the one or more processors, based on the flight path, including:
docking the UAV with the power supply device for charging the battery associated with the UAV including:
landing the UAV on a power line carrying an alternating current;
converting the alternating current carried by the power line to a direct current; and
charging the battery associated with the UAV using the direct current; and
upon arriving at the destination location, providing, by the one or more processors via a speaker and/or display in the UAV, a recommendation to one or more people at the destination location on how to respond to a natural disaster at the destination location.

5. The computer-implemented method of claim 4, further comprising:
receiving, by the one or more processors, a command to follow the flight path to a location of the power supply device and to charge the power supply utilizing the power supply device at the power supply device location.

6. The computer-implemented method of claim 4, further comprising:
coupling, by the one or more processors, the UAV to the power supply device via a tether.

7. A non-transitory computer-readable memory storing executable instructions that, when executed by one or more processors, cause the one or more processors to:
- transmit data indicative of a battery charge level of a battery associated with an unmanned aerial vehicle (UAV) from the UAV to a server device as the UAV is en route to a destination location;
- receive a flight path, from the server device in response to the data indicative of the battery charge level, to a power supply device within a flight range of the UAV as the UAV is en route to the destination location, wherein the flight range is based upon a geographic location of the UAV and the battery charge level of the battery associated with the UAV; and
- operate based on the flight path, including:
  - docking the UAV with the power supply device for charging the battery associated with the UAV including:
    - landing the UAV on a power line carrying an alternating current;
    - converting the alternating current carried by the power line to a direct current; and
    - charging the battery associated with the UAV using the direct current; and
- upon arriving at the destination location, provide, via a speaker and/or display in the UAV, a recommendation to one or more people at the destination location on how to respond to a natural disaster at the destination location.

8. The non-transitory computer-readable memory of claim 7, wherein the instructions further cause the processor to:
- receive a command to follow the flight path to a location of the power supply device and to charge the power supply utilizing the power supply device at the power supply device location.

9. The non-transitory computer-readable memory of claim 7, wherein the instructions further cause the processor to:
- couple the UAV to the power supply device via a tether.

* * * * *